United States Patent
Zhang et al.

(10) Patent No.: US 10,897,057 B2
(45) Date of Patent: Jan. 19, 2021

(54) COMPLETE OXIDATION OF SUGARS TO ELECTRICITY BY USING CELL-FREE SYNTHETIC ENZYMATIC PATHWAYS

(71) Applicant: TIANJIN INSTITUTE OF INDUSTRIAL BIOTECHNOLOGY, CHINESE ACADEMY OF SCIENCES, Tianjin (CN)

(72) Inventors: Yi Heng Percival Zhang, Blacksburg, VA (US); Zhiguang Zhu, Tianjin (CN)

(73) Assignee: TIANJIN INSTITUTE OF INDUSTRIAL BIOTECHNOLOGY, CHINESE ACADEMY OF SCIENCES, Tianjin (CN)

( * ) Notice: Subject to any disclaimer, the term of this patent is extended or adjusted under 35 U.S.C. 154(b) by 125 days.

(21) Appl. No.: 16/135,796

(22) Filed: Sep. 19, 2018

(65) Prior Publication Data

US 2019/0020049 A1 Jan. 17, 2019

Related U.S. Application Data

(62) Division of application No. 14/773,510, filed as application No. PCT/US2014/041103 on Jun. 5, 2014, now Pat. No. 10,128,522.

(60) Provisional application No. 61/831,346, filed on Jun. 5, 2013.

(51) Int. Cl.
*H01M 8/16* (2006.01)

(52) U.S. Cl.
CPC .............. *H01M 8/16* (2013.01); *Y02E 60/50* (2013.01)

(58) Field of Classification Search
CPC .............................. H01M 8/16; Y02E 60/527
See application file for complete search history.

(56) References Cited

U.S. PATENT DOCUMENTS

| | | | |
|---|---|---|---|
| 4,490,464 A | 12/1984 | Gorton et al. | |
| 5,049,494 A | 9/1991 | Allenza | |
| 6,716,596 B2 | 4/2004 | Fish et al. | |
| 2004/0101741 A1 | 5/2004 | Minteer et al. | |
| 2005/0287399 A1 | 12/2005 | Ladisch et al. | |
| 2012/0077242 A1* | 3/2012 | Swartz | C12P 3/00 435/168 |

FOREIGN PATENT DOCUMENTS

| | | |
|---|---|---|
| CN | 102214835 A | 10/2011 |
| KR | 20100082151 A | 7/2010 |
| WO | 2008098227 A2 | 8/2008 |

(Continued)

OTHER PUBLICATIONS

Zhao, X. et al. Kinetic limitations of a bioelectrochemical electrode using carbon nanotube-attached glucose oxidase for biofuel cells, Biotechnol. Bioeng. 2009. 104:1068-1074. Wiley InterScience.

(Continued)

*Primary Examiner* — Jeremiah R Smith
(74) *Attorney, Agent, or Firm* — Novick, Kim & Lee, PLLC; Allen Xue

(57) ABSTRACT

The present invention is in the field of bioelectricity. The present invention provides energy generating systems, methods, and devices that are capable of converting chemical energy stored in sugars into useful electricity.

8 Claims, 22 Drawing Sheets

Air-breathing I-cell

Different enzyme immobilization methods

(56) References Cited

FOREIGN PATENT DOCUMENTS

WO    2011022651 A1    2/2011
WO    2011145000 A1    11/2011

OTHER PUBLICATIONS

Zhu Z, Wang Y, Minteer S, Zhang Y-H P. Maltodextrin-powered enzymatic fuel cell through a non-natural enzymatic pathway, J. Power Sources. 2011. 196:7505-7509. Elsevier.
Zhu Z G et al. Deep oxidation of glucose in enzymatic fuel cells through a synthetic enzymatic pathway containing a cascade of two thermostable dehydrogenases, Biosens. Bioelectron. 2012. 36:110-115.
Zhang et al. A new high-energy density hydrogen carrier-carbohydrate-might be better than methanol, Int. Journ. of Energy Res. Mar. 2012 (Mar. 3, 2012). vol. 37, No. Iss. 7, 3, pp. 769-779.
Zhu et al. A high-energy-density sugar biobattery based on a synthetic enzymatic pathway, Nature Commun. Jan. 2014. vol. 5, 21 pp. 1-8., XP008166911, DOI: doi:10.1038/ncomms4026, Macmillan Pub.
Mratin Del Campo et al., High-Yield Production of Dihydrogen from Xylose by Using a Synthetic Enzyme Cascade in a Cell-Free, Angewandte Chemie International Edition, 2013, vol. 52, p. 4587-4590.
Zhu et al., "Maltodextrin-powered enzymatic fuel cell through a non-natural enzymatic pathway", Journal of Power Sources, 2011,vol. 196, p. 7505-7509.
David L Nelson et al.; Glycolysis, Gluconeogenesis and the Pentose Phosphate Pathway; Lehninger principles of biochemistry, sixth edition; Publisher: New York : W.H. Freeman, 2013. Chapter 14.
Addo, P. K., Arechederra, R. L. and Minteer, S. D. Evaluating enzyme cascades for methanol/air biofuel cells based on NAD.sup.+-dependent enzymes. Electroanalysis. 2010. 22, No. 7-8, 807-812. InterScience.
Akers, N. L., C. M. Moore and S. D. Minteer. Development of alcohol/O2 biofuel cells using salt-extracted tetrabutylammonium bromide/Nafion membranes to immobilize dehydrogenase enzymes. Electrochimica. 2005. Acta 50(12):2521-2525. Elsevier.
Ardao I. and Zeng, A. P. In silico evaluation of a complex multi-enzymatic system using one-pot and modular approaches: Application to the high-yield production of hydrogen from a synthetic metabolic pathway. Chem. Eng. Sci. 2013. 87:183-193. Elsevier.
Arechederra, R. dnd S. D. Minteer. Organelle-based biofuel cells: [0188] Immobilized mitochondria on carbon paper electrodes. Electrochimica. 2008. Acta 53(23):6698-6703. Elsevier.
Arechederra, R. L. and Minteer, S. D. Complete oxidation of glycerol in an enzymatic biofuel cell. Fuel Cells. 2009. 9:63-69. ResearchGate.
Bujara, M., Schumperli, M., Pellaux, R., Heinemann, M. and Panke, S. Optimization of a blueprint for in vitro glycolysis by metabolic real-time analysis. Nat. Chem. Biol. 2011. 7:271-277. ResearchGate.
Calabrese Barton, S., Gallaway, J. and Atanassov, P. Enzymatic biofuel cells for implantable and microscale devices. Chem. Rev. 2004. 104:4867-4886. American Chemical Society.
Campbell, E., Meredith, M., Minteer, S. D. and Banta, S. Enzymatic biofuel cells utilizing a biomimetic cofactor Chem. Commun. 2012. 48:1898-1900. The Royal Society of Chemistry.
Caruana, D. J. and Howorka, S. Biosensors and biofuel cells with engineered proteins. Mol. BioSyst. 2010. 6.1548-1556. Royal Society of Chemistry.
Chakraborty, S., Sakka, M., Kimura, T. and Sakka, K. Two proteins with diaphorase activity from Clostridium thermocellum and Moorella thermoacetica. Biosci. Biotechnol. and Biochem. 2008. 72:877-879. ResearchGate.
Chaudhuri, S. K. and Lovley, D. R. Electricity generation by direct oxidation of glucose in mediatorless microbial fuel cells. Nat. Biotechnol. 2003. 21:1229-1232. Department of Microbiology. Massachusetts, USA.

Chen, Z. et al. Three-dimensional flexible and conductive interconnected graphene networks grown by chemical vapour deposition. Nature Materials. 2011. 10:424-428. Macmillian.
Chen, S. et al. Layered corrugated electrode macrostructures boost microbial bioelectrocatalysis. Energy Environ. Sci. 2012. 5:9769-9772. The Royal Society of Chemistry.
Cooney, M. J. et al. Enzyme catalysed biofuel cells. Energy Environ. Sci. 2008. 1:320-337. The Royal Society of Chemistry.
Hong, J. et al. Simple protein purification through affinity adsorption on regenerated amorphous cellulose followed by intein self-cleavage. J. Chromatogr. A. 2008. 1194:150-154. Elsevier.
Huang, S. Y. et al. A thermostable recombinant transaldolase with high activity over a broad pH range. Appl. Microbiol. Biotechnol. 2012. 93:2403-2410. ResearchGate.
Johnston, W. et al. Design and characterization of redox enzyme electrodes: new perspectives on established techniques with application to an extremeophilic hydrogenase. Enzyme Microb. Technot 2005. 36:540-549. Elsevier.
Kim, J. et al. Challenges in biocatalysis for enzyme-based biofuel cells. Biotechnol. 2006. Adv. 24:296-308. Elsevier.
Kim, Y. H. et al. Complete Oxidation of Methanol in Biobattery Devices Using a Hydrogel Created from Three Modified Dehydrogenases. Angew. Chem. Int. Ed. 2013. 52:1437-1440. Wiley Online Library.
Krutsakorn, B. et al. In vitro production of n-butanol from glucose. Metabolic Engineering. 2013. 20:84-91. dsevier.
Martin Del Campo, J. S. et al. "High-Yield Production of Dihydrogen from Xylose by Using a Synthetic Enzyme Cascade in a Cell-Free System." Angew. Chem. Int. Ed. 2013. 52:587-4590. Wiley Online Library.
Minteer, S. D. et al. Enzyme-based biofuel cells. Curr. Opin. Biotechnol.2007. 18(3):228-234. Elsevier.
Moehlenbrock, M. et al. Extended lifetime biofuel cells. Chem. Soc. Rev. 2008. 37:1188-1196. The Royal Society of Chemistry.
Myung, S., Wang et al. Fructose-1,6-bisphosphatase from a hyperthermophilic bacterium Thermotoga maritima: Characterization, metabolite stability and its implications. Proc. Biochem. 2010. 45:1882-1887. Elsevier.
Myung, S. et al. Ultra-stable phosphoglucose isomerase through immobilization of cellulose-binding module-tagged thermophilic enzyme on low-cost high-capacity cellulosic adsorbent. Biotechnol. Prog.2011. 27:969-975. ResearchGate.
Myung, S. and Zhang, Y.-H. P. Non-complexed four cascade enzyme mixture: simple purification and synergetic co-stabilization. PLos One. 2013. vol. 8, Issue 4, e61500. ResearchGate.
Okuno H, Nagata K, Nakajima H. Purification and properties of glucose-6-phosphate dehydrogenase from Bacillus stearothermophilus. Journal of Appl. Biochem. 1985. 7:192-201. Academic Press.
Palmore, G. T. R., Bertschy, H., Bergens, S. H. and Whitesides, G. M. A methanol/dioxygen biofuel cell that uses NAD.sup.+-dependent dehydrogenases as catalysts: application of an electro-enzymatic method to regenerate nicotinamide adenine dinucleotide at low overpotentials. J. Electroanal. 1998. Chem. 443:155-161. Elsevier.
Rollin, J. A., Tam, W. and Zhang, Y.-H. P. New biotechnology paradigm: cell-free biosystems for clmanufacturing. Green Chem. 2013. 15:1708-1719. RSCPublishing.
Sakai, H. et al., A high-power glucose/oxygen biofuel cell operating under quiescent conditions. ECS Trans. 2009. 16 (38):9-15. The Electrochemical Society.
Sakai, H., T. Nakagawa et al., A high-power glucose/oxygen biofuel cell operating under quiescent conditions. Energy Environ. 2009. Sci. 2:133-138. The Royal Society of Chemistry.
Shimizu, Y. et al. Cell-free translation reconstituted with purified components. Nat. Biotechnol. 2001. 19:751-755. ResearchGate.
Sokic-Lazic, D. et al. Citric acid cycle biomimic on a carbon electrode. Biosens. Bioelectron. 2008. 24(4):939-944. Elsevier.
Sun, F. F. et al. Thermophilic Thermotoga maritima ribose-5-phosphate isomerase RpiB: Optimized heat treatment purification and basic characterization. Protein Expr. Purif. 2012. 82:302-307. Elsevier.
Togo, M. et al. An enzyme-based microlluidic biofuel cell using vitamin K3-mediated glucose oxidation. Electrochimica Acta. 2007. 52:4669-4674. Elsevier.

(56) References Cited

OTHER PUBLICATIONS

Tokita, Y. et al. Sony's Biofuel Cell. ECS Trans. 2008. 13(21):89-97. The Electrochemical Society.

Walcarius, A. et al. Nanomaterials for bio-functionalized electrodes: recent trends. J. Mat. Chem. B. 2013. 1:4878-4908. RSC Publishing.

Wang, Y. et al. A highly active phosphoglucomutase from Clostridium thermocellum: Cloning, purification, characterization, and enhanced thermostability. J. Appl. Microbiol. 2009. 108:39-46. Society for applied microbiology.

Wang, Y. et al. Biohydrogenation from biomass sugar mediated by in vitro synthetic enzymatic pathways. Chem. Biol. 2011. 18:72-380. Cell press.

Willner, B. et al. Electrical contacting of redox proteins by nanotechnological means. Curr. Opin. Biotechnol. 2006. 17:589-596. Elsevier.

Wu, Z.-Y. et al. Ultralight, Flexible, and Fire-Resistant Carbon Nanofiber Aerogels from Bacterial Cellulose. Angew. Chem. Int. Ed. 2013. 52:2925-2929. Wiley-VCH Verlag GmbH & Co. KGaA, Weinheim.

Xu, S. and Minteer, S. D. Enzymatic Biofuel Cell for Oxidation of Glucose to $CO_2$. ACS Catal. 2011. 1:91-94. ACS Publications.

You, C., Myung, S. and Zhang, Y.-H. P. Facilitated substrate channeling in a self-assembled trifunctional enzyme complex. Angew. Chem. Int. Ed. 2012. 51:8787-8790. Wiley-VCH Verlag GmbH & Co. KGaA, Weinheim.

You, C. et al. Enzymatic transformation of nonfood biomass to starch. 2013. 110:7182-7187. Proc. Nat. Acad. Sci. USA.

Ye, X. et al. Synthetic metabolic engineering—a novel, simple technology for designing a chimeric metabolic pathway. Microb. Cell Fact. 2012. 11:120. ResearchGate.

Zaks, A. and Klibanov, A. M. The effect of water on enzyme action in organic media. J. Biol. Chem. 1988. 263:8017-8021. The American Society for Biochemistry and Molecular Biology, Inc.

Zebda A. et al. Mediatorless high-power glucose biofuel cells based on compressed carbon nanotube-enzyme electrodes. Nat. Commun. 2011. 2:370. Macmillan Publishers.

Zhang, Y.-H. P., Cui, J., Lynd, L. R. and Kuang, L. R. A transition from cellulose swelling to cellulose dissolution by o-phosphoric acid: evidence from enzymatic hydrolysis and supramolecular structure. Biomacromolecules. 2006. 7, 644-648. American Chemical Society.

Zhang, Y.-H. P. A sweet out-of-the-box solution to the hydrogen economy: is the sugar-powered car science fiction? Energy Environ. Sci. 2009. 2:272-282. ResearchGate.

Zhang, Y.-H. P. Production of biocommodities and bioelectricity by cell-free synthetic enzymatic pathway biotransformations: Challenges and opportunities. Biotechnol. Bioeng. 2010. 105:663-677. Wiley InterScience.

\* cited by examiner

PPT, polyphosphate:AMP phosphotransferase,
ADK, polyphosphate-independent adenylate kinase PPK: polyphosphate kinase

COMPLETE OXIDATION OF SUGARS TO ELECTRICITY BY USING CELL-FREE SYNTHETIC ENZYMATIC PATHWAYS

CROSS-REFERENCE TO RELATED APPLICATION

This application is a divisional application of U.S. application Ser. No. 14/773,510 filed on Sep. 8, 2015, which is a national stage application of PCT/US2014/041103 filed on Jun. 5, 2014, which claims the benefit of U.S. Provisional Application No. 61/831,346 filed on Jun. 5, 2013, respectively, the contents of which are incorporated herein by reference in its entirety.

BACKGROUND OF THE INVENTION

Field of the Invention

The present invention relates to the field of bioelectricity. More particularly, the present invention provides energy generating systems, methods, and devices that are capable of converting chemical energy stored in a variety of renewable sugars into useful electricity. In specific embodiments, the present invention relates to novel synthetic enzymatic pathways for converting chemical energy from six-carbon and five-carbon sugars to electricity using enzymatic fuel cells, and several key enzymes with engineered and/or newly-discovered functions.

Discussion of Related Art

Batteries are electricity storage devices. Rechargeable batteries are currently available. But, the energy storage densities of such rechargeable batteries are much lower than those the energy storage densities of hydrogen or liquid fuels (FIG. 1, Panels A and B). There is a clear need for better rechargeable batteries (FIG. 1, Panel C) with higher energy storage density, lower costs over their entire life cycle, reduced environmental impact, and increased safety.

Enzymatic fuel cells (EFCs) are a type of biological fuel cells that employ enzymes to convert the chemical energy in the fuels into electricity. EFCs are superior to batteries mainly because they: 1) have approximately 10-100 times higher energy storage densities than chemical batteries; and 2) are more environmentally friendly due to the biodegradability and elimination of heavy metals and costly rare metals. EFCs (FIG. 2, Panel B) have some things in common with directed methanol fuel cells (DMFCs) (FIG. 2, Panel A). But, unlike DMFCs, the enzymatic fuel cells do not need costly platinum as an anode catalyst, and they may not use nafion membrane due to high selectivity of enzymes. In addition, sugars used in EFCs are less costly, non-toxic and, non-flammable compared to methanol in DMFCs, with energy densities of a sugar solution being higher than the energy densities of 1 M methanol solution. Enzymatic fuel cells are usually composed of an enzyme-loaded (enzyme-modified) anode and an enzyme-loaded (enzyme-modified) cathode (FIG. 2, Panel B).

In EFCs, electrons are generated when fuels are oxidized at an anode. The electrons then flow from the anode through an external load to a cathode. Protons are generated simultaneously (with the electrons) in the anodic reactions and pass through the polymer separator to the cathode to compensate for the electron flow. One of the largest challenges with EFCs is the extraction of most or all of the chemical energy from the low-cost and most abundant sugars for electricity generation. The methods to utilize the all energy of the sugars have not been developed so far, except for the methods that utilize sugars as a heat energy source by combustion in air or as a chemical energy source for the production of ATP through NAD(P)H generated by redox enzymes in living organisms (such as microorganisms, animals). There is no method that is capable of effectively utilizing most of the chemical energy of sugars directly as electric (electrical) energy.

BRIEF SUMMARY OF THE INVENTION

In one embodiment, the present invention provides a process for generating electrons from hexose sugars comprising: generating glucose 6-phosphate (G6P) from a chemical reaction of 6-carbon sugar monomers or one or more 6 carbon sugars from oligohexoses or polyhexoses reacted with polyphosphate or ATP or phosphate, wherein: (i) when using polyphosphate, the chemical reaction is performed in the presence of polyphosphate-glucose phosphotransferase; or (ii) when using ATP, the chemical reaction is performed in the presence of hexokinase, and wherein the ATP is generated by reacting ADP and polyphosphate in the presence of polyphosphate kinase; (iii) when using free phosphate, the chemical reaction is performed in the presence of glucan phosphorylases (e.g., starch phosphorylase, maltose phosphorylase, sucrose phosphorylase, cellobiose phosphorylase, cellodextrin phosphorylase) and phosphoglucomutase; reacting the G6P and 6PG with NAD or its analogues (called biomimics in the oxidized form) in water to obtain NADH or the reduced biomimics; and oxidizing the NADH or the reduced biomimics on an anode at its surface to generate electrons. In one embodiment, the product of ribulose 5-phosphate is converted to G6P via a hybrid pathway of the non-oxidative pentose phosphate pathway, glycolysis and gluconeogenesis.

In another embodiment, the process further comprises NAD biomimetics (FIG. 7, compounds A-E) to replace NAD.

In some embodiments, the process further comprises engineered glucose 6-phosphate dehydrogenase and 6-phosphogluconate dehydrogenase that can utilize NAD biomimics.

In some embodiments, the process further comprises glucose as the sugar. In one embodiment, glucose is converted to glucose 6-phosphate via polyphosphate glucokinase or hexokinase. In some embodiments, the process further comprises generating the glucose from: (i) converting fructose to glucose using glucose (xylose) isomerase; or (ii) converting fructose to glucose with sorbitol dehydrogenase and aldehyde reductase.

In other embodiments, the process further comprises generating fructose or fructose 6-phosphate by: (i) converting mannose to fructose using mannose isomerase and then, in one embodiment, enter the above fructose-utilization pathway; (ii) converting mannose to fructose 6-phosphate (F6P) using polyphosphate-glucose mannose phosphotransferase and phosphomannose isomerase and, in one embodiment, the product F6P enters a modified pentose phosphate pathway; or (iii) converting mannose to fructose-6-phopshate by using polyphosphate kinase, hexokinase, and phosphomannose isomerase and, in one embodiment, then the product F6P enters a modified pentose phosphate pathway.

In some embodiments, the process further comprises starch or maltodextrin as the sugars. In other embodiments, the process further comprises phosphate and phosphoglucomutase and starch or maltodextrin phosphorylase for G6P generation.

In some embodiments, the present invention provides a sugar battery comprising: a solution capable of generating glucose 6-phosphate (G6P) from 6-carbon sugar monomers or one or more 6 carbon sugars from oligohexoses or polyhexoses reacted with polyphosphate or ATP or phosphate, and for reacting the G6P with NAD or its analogues in water to obtain NADH or its analogues (biomimetics), wherein: (i) when using polyphosphate, the chemical reaction is performed in the presence of polyphosphate-glucose phosphotransferase; or (ii) when using ATP, the chemical reaction is performed in the presence of hexokinase, and wherein the ATP is generated by reacting ADP and polyphosphate in the presence of polyphosphate kinase; (iii) when using free phosphate, the chemical reaction is performed in the presence of glucan phosphorylases and phosphoglucomutase; an enzyme-modified anode; an enzyme-modified or standard platinum reference cathode; and an electrolyte, wherein the enzyme-modified anode or anode is in contact with the solution comprising the six carbon sugars and some enzymes in the synthetic pathways and both the cathode and the enzyme-modified anode are in contact with the electrolyte.

In some embodiments, an electrolyte is made of the pH-control buffer (e.g., HEPES) containing metal ions such as ($Mg^{++}$, $Mn^{++}$), $NAD^+$ or NADH or its biomimics, and thiamine pyrophosphate: In some embodiments, the battery is operably configured for allowing the oxidation of the NADH or its biomimetics on the anode at its surface to generate electrons.

In some embodiments, the present invention provides a system for energy generation comprising: a fuel comprising a solution for generating glucose 6-phosphate (G6P) from 6-carbon sugar monomers or one or more 6 carbon sugars from oligohexoses or polyhexoses reacted with polyphosphate or ATP or phosphate, and for reacting the G6P with $NAD^+$ and oxidized biomimetics in water to obtain NADH and reduced biomimics, wherein: (i) when using polyphosphate, the chemical reaction is performed in the presence of polyphosphate-glucose phosphotransferase; or (ii) when using ATP, the chemical reaction is performed in the presence of hexokinase, and wherein the ATP is generated by reacting ADP and polyphosphate in the presence of polyphosphate kinase; (iii) when using free phosphate, the chemical reaction is performed in the presence of glucan phosphorylases and phosphoglucomutase; a fuel cell operably configured for oxidizing the NADH and its biomimics at an anode to generate electrons and for delivering the electrons, e.g., via an outside circuit to a cathode. In one embodiment, a catalyst on cathode converts protons and oxygen to water.

In some embodiments, the present invention provides a process for generating electrons from the pentose sugars comprising: generating xylulose 5-phosphate (X6P) from a chemical reaction of 5-carbon sugar monomers reacted with polyphosphate or ATP, wherein: (i) when using polyphosphate, the chemical reaction is performed in the presence of xylose isomerase and polyphosphate xylulokinase; or (ii) when using ATP, the chemical reaction is performed in the presence of xylose isomerase and ATP-based xylulokinase, and wherein the ATP is generated by reacting ADP and polyphosphate in the presence of polyphosphate kinase or a combination of polyphosphate:AMP phosphotransferase and polyphosphate-independent adenylate kinase; entering the pentose phosphate pathway for generation of G6P; reacting the G6P with $NAD^+$ and the oxidized biomimics in water to obtain NADH and the reduced biomimics; oxidizing the NADH and the reduced biomimics on an anode at its surface to generate electrons.

In some embodiments, the present invention provides a sugar battery comprising:

a solution capable of generating xylulose 5-phosphate from 5-carbon sugar monomers reacted with polyphosphate or ATP, and for producing glucose 6-phosphate through non-oxidative pentose phosphate pathway, and reacting the G6P with $NAD^+$ or its analogues in water to obtain NADH or its analogues (biomimetics), wherein: a. when using polyphosphate, the chemical reaction is performed in the presence of polyphosphate-xylulose kinase; or b. when using ATP, the chemical reaction is performed in the presence of xylulokinase, and wherein the ATP is generated by reacting ADP and polyphosphate in the presence of polyphosphate kinase; an enzyme-modified anode or anode; an enzyme-modified or standard platinum reference cathode; and an electrolyte, wherein the enzyme-modified anode or anode is in contact with the solution comprising the five carbon sugars and some enzymes in the synthetic pathways and both the cathode and the enzyme-modified anode are in contact with the electrolyte.

In some embodiments, an electrolyte is made of the pH-control buffer (e.g., HEPES) containing metal ions such as ($Mg^{++}$ or $Mn^{++}$), NAD+ or NADH or its biomimics, and thiamine pyrophosphate.

In some embodiments, the present invention provides a system for energy generation comprising: a fuel comprising a solution for generating xylulose 5-phosphate from five-carbon sugar monomers reacted with polyphosphate or ATP, and for generation of G6P through the non-oxidative pentose phosphate pathway, for reacting the G6P with $NAD^+$ and its biomimetics in water to obtain NADH and reduced biomimics, wherein: (i) when using polyphosphate, the chemical reaction is performed in the presence of polyphosphate-xylulokinase; or (ii) when using ATP, the chemical reaction is performed in the presence of xylulokinase, and wherein the ATP is generated by reacting ADP and polyphosphate in the presence of polyphosphate kinase; a fuel cell operably configured for oxidizing the NADH and its biomimics at an anode to generate electrons and for delivering the electrons to a cathode; an electrical generator for converting the electrons from the cathode into electricity.

In some embodiments, the present invention provides a process for generating electrons from a sugar comprising: generating NADH or a reduced biomimic thereof from the sugar; and oxidizing the NADH or a reduced biomimic thereof to generate the electrons at an anode, wherein the NADH or a reduced biomimic thereof is generated using a group of enzymes comprising glucose 6-phosphate dehydrogenase, 6-phosphogluconate dehydrogenase, ribose 5-phosphate isomerase, ribulose 5-phosphate 3-epimerase, transketolase, transaldolase, triose phosphate isomerase, aldolase, fructose 1,6-bisphosphatase, and phosphoglucose isomerase.

In some embodiments, the process comprises a hexose or a pentose sugar as the sugar.

In one embodiment of the process, the NADH or a reduced biomimic thereof is oxidized by diaphorase. In another embodiment of the process, the NADH or a reduced biomimic thereof is oxidized in the presence of one or more of vitamin $K_3$, benzyl viologen, or a biomimetic thereof. In some embodiments, one or more of vitamin $K_3$, benzyl viologen, or a biomimetic thereof is immobilized on the anode surface. In other embodiments, one or more of vitamin $K_3$, benzyl viologen, or a biomimetic thereof is free in the anode compartment.

In some embodiments, the present invention provides a sugar battery comprising: a solution comprising a sugar, enzymes, and an electrolyte; an anode; and a cathode, wherein the anode and the cathode are in contact with the solution; wherein the electrolyte comprises a pH-control buffer containing metal ions, NAD or NADH or a biomimic thereof, and thiamine pyrophosphate, and wherein the enzymes comprise glucose 6-phosphate dehydrogenase, 6-phosphogluconate dehydrogenase, ribose 5-phosphate isomerase, ribulose 5-phosphate 3-epimerase, transketolase, transaldolase, triose phosphate isomerase, aldolase, fructose 1,6-bisphosphatase, phosphoglucose isomerase, and an enzyme capable of oxidizing NADH or a biomimic thereof.

In some embodiments, the sugar battery comprises a hexose or a pentose sugar as the sugar. In some embodiments of the sugar battery, the enzyme capable of oxidizing NADH or a reduced biomimic thereof is diaphorase.

In some embodiments, the sugar battery further comprises one or more of vitamin $K_3$, benzyl viologen, or a biomimetic thereof. In some embodiments, one or more of vitamin $K_3$, benzyl viologen, or a biomimetic thereof is immobilized on the anode surface. In other embodiments, one or more of vitamin $K_3$, benzyl viologen, or a biomimetic thereof is free in the anode compartment.

In some embodiments, the present invention provides a system for electricity generation comprising: a solution comprising a sugar, enzymes, and an electrolyte; a fuel cell comprising an anode and a cathode; and an electrical generator, wherein the solution and the electrical generator are in contact with the fuel cell; wherein the electrolyte comprises a pH-control buffer containing metal ions, $NAD^+$ or NADH or a biomimic thereof, and thiamine pyrophosphate; and wherein the enzymes comprise glucose 6-phosphate dehydrogenase, 6-phosphogluconate dehydrogenase, ribose 5-phosphate isomerase, ribulose 5-phosphate 3-epimerase, transketolase, transaldolase, triose phosphate isomerase, aldolase, fructose 1,6-bisphosphatase, phosphoglucose isomerase, and an enzyme capable of oxidizing NADH or a biomimic thereof.

In some embodiments, the system comprises a hexose or a pentose sugar or a mixture thereof as the sugar. In some embodiments of the system, the enzyme capable of oxidizing NADH or a reduced biomimic thereof is diaphorase.

In some embodiments, the system further comprises one or more of vitamin $K_3$, benzyl viologen, or a biomimetic thereof. In some embodiments, one or more of vitamin $K_3$, benzyl viologen, or a biomimetic thereof is immobilized on the anode surface. In other embodiments, one or more of vitamin $K_3$, benzyl viologen, or a biomimetic thereof is free in the anode compartment.

BRIEF DESCRIPTION OF THE DRAWINGS/FIGURES

These drawings illustrate certain aspects of some of the embodiments of the present invention, and should not be used to limit or define the invention.

FIG. 1 shows energy density comparison. Panel A is a graph showing a comparison of energy storage densities of various fuels and batteries. Panel B is a graph showing a comparison of energy storage densities of hydrogen storage techniques. Panel C is a graph showing a comparison of energy storage densities of rechargeable batteries.

FIG. 2 shows comparison of a directed methanol fuel cell (DMFC) and an enzymatic fuel cell (EFC) fueled by sugars. Panel A is a schematic diagram of a typical DMFC. Panel B is a schematic diagram of a typical EFC that can completely oxidize a sugar ($CH_2O$) through synthetic enzymatic pathways.

Figure 9:
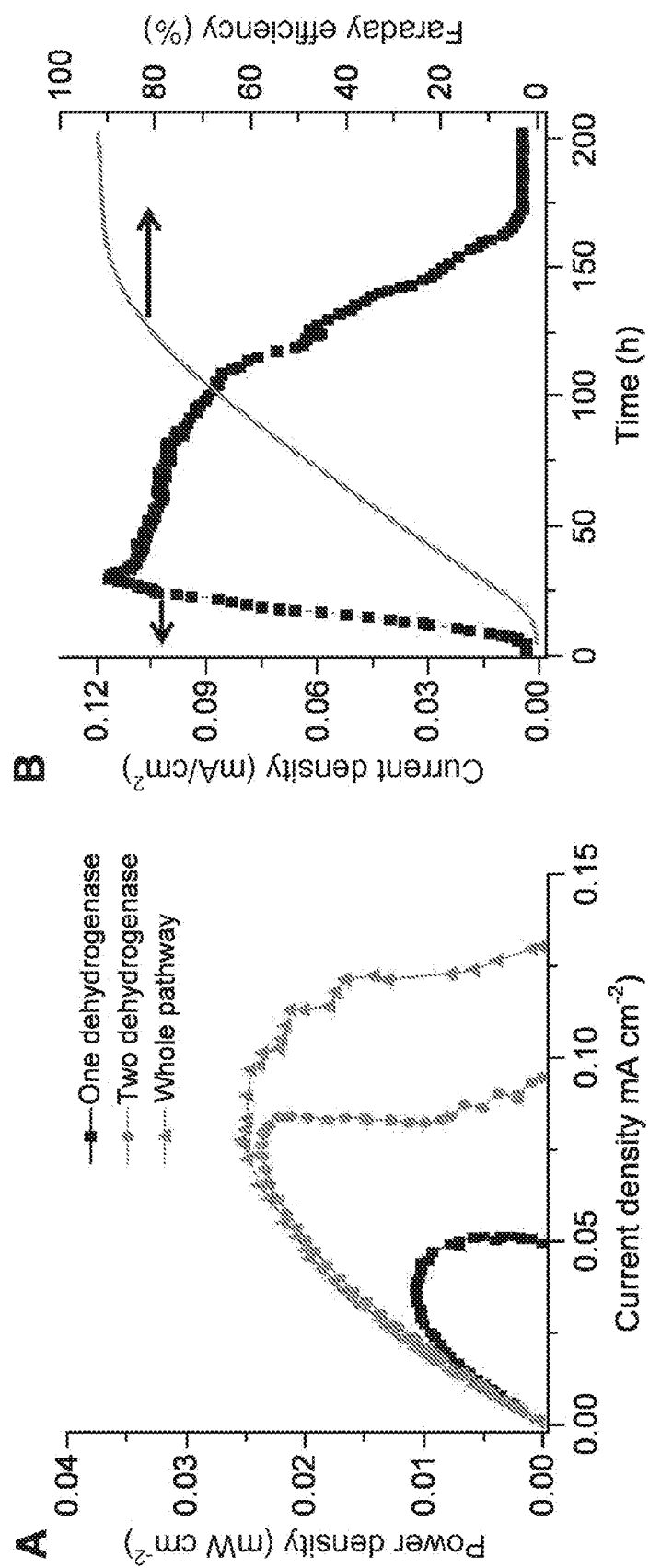

FIG. 9—Panel A is a graph showing power density versus current density of a sugar battery using G6PDH; G6PDH and 6PGDH; and the entire pathway. Panel B is a graph showing current generation curve versus time and the Faraday efficiency curve for complete oxidation.

Figure 10:
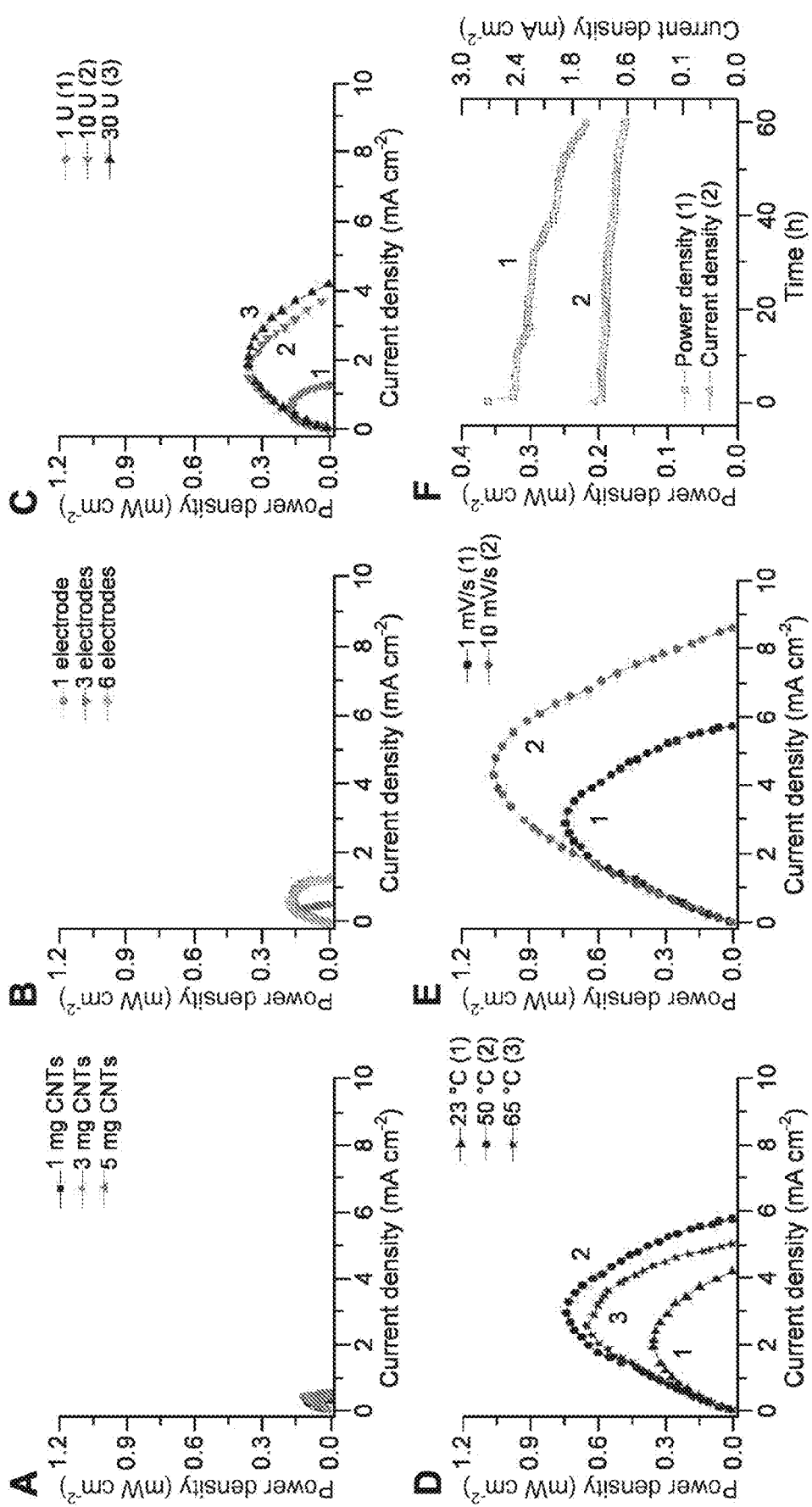

FIG. 10 comprises graphs showing profiles for the optimization of power outputs of sugar-powered EFC (Panels A-E) and continuous outputs of power and current of 13-enzyme EFC powered by maltodextrin at an external load of 150Ω at room temperature (Panel F). Panel A, loading of CNT on each carbon paper; Panel B, number of carbon paper; Panel C, enzyme loading; Panel D, temperature; and Panel E, scanning rate.

Figure 11:
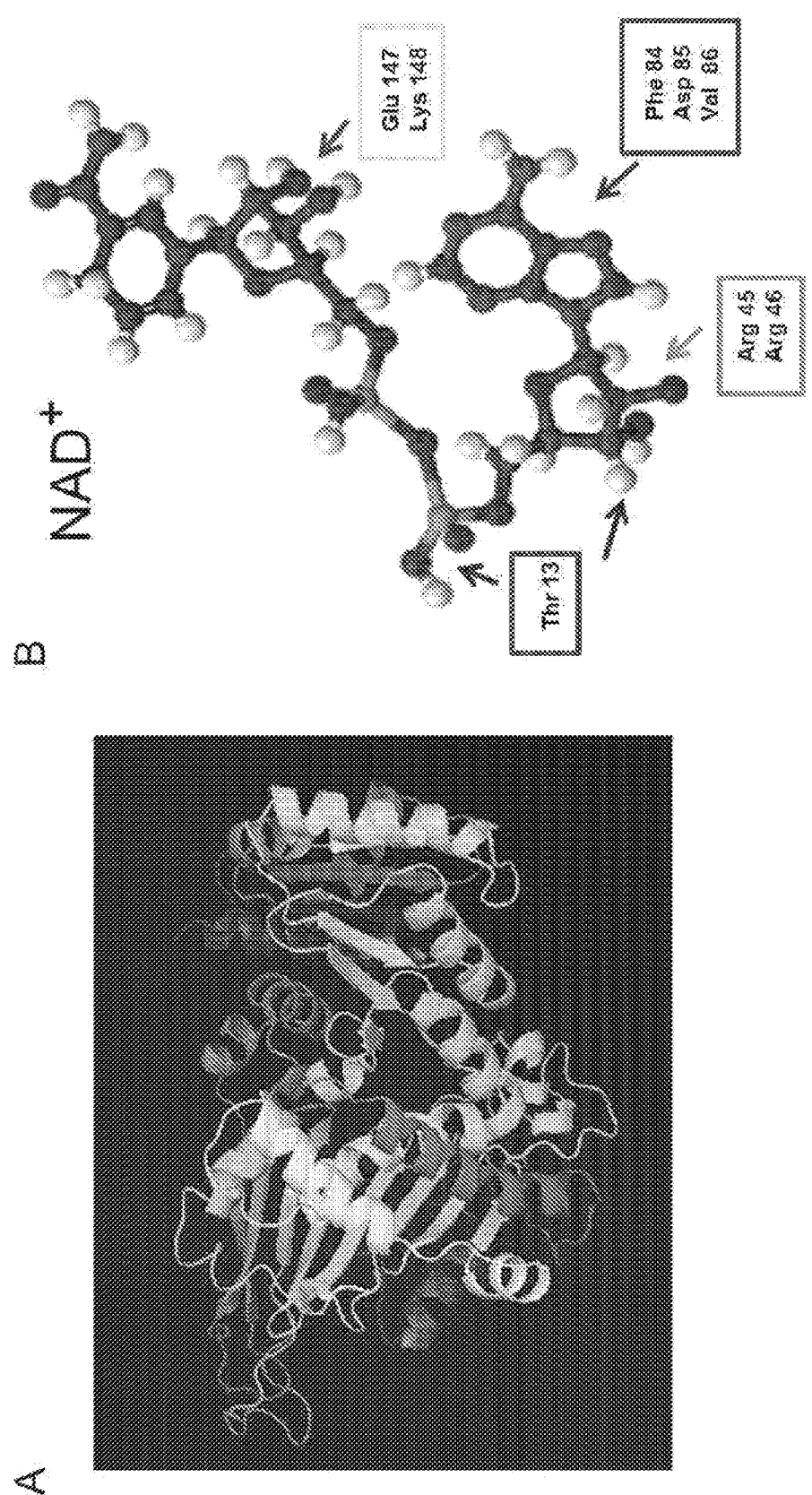

FIG. 11—Panel A is *Geobacillus stearothermophilus* glucose 6-phosphate dehydrogenase (GsG6PDH) homology structure. Panel B shows NAD-binding sites in GsG6PDH.

Figure 12:
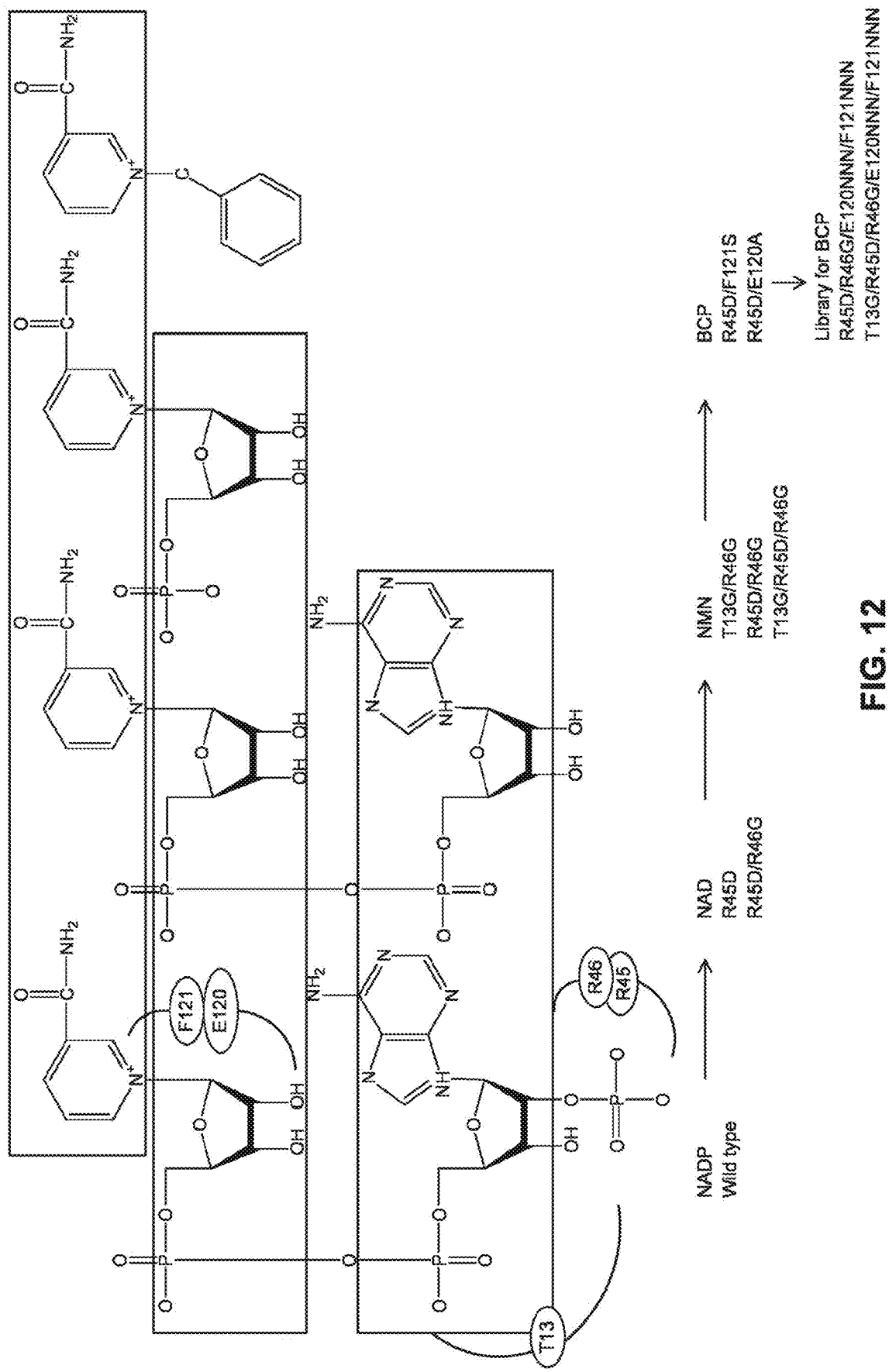

FIG. 12 shows a pathway for engineered GsG6PDH working on natural cofactors and biomimetic cofactors (biomimics) with key amino acid mutagenesis.

Figure 13:
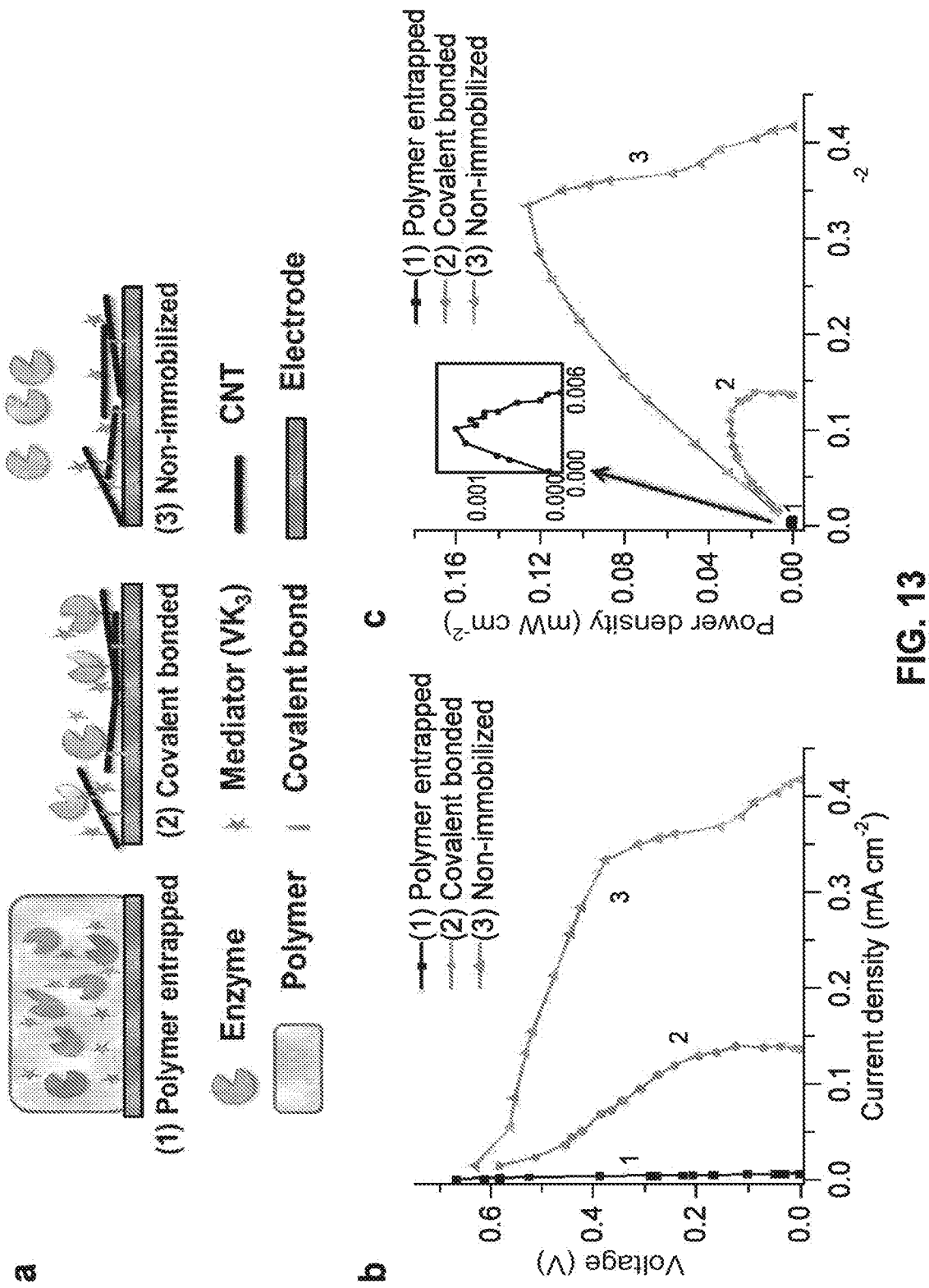

FIG. 13—Panel A shows a schematic of electrodes with (1) enzymes immobilized by tetrabutylammomium bromide (TBAB)-modified nafion polymer entrapped immobilization, (2) enzymes immobilized by covalent bonded carbon nanotube (CNT) immobilization, and (3) non-immobilized enzymes. Panel B is a graph showing a profile for voltage versus current density for the three electrodes. Panel C shows a profile for power versus current density.

Figure 14:
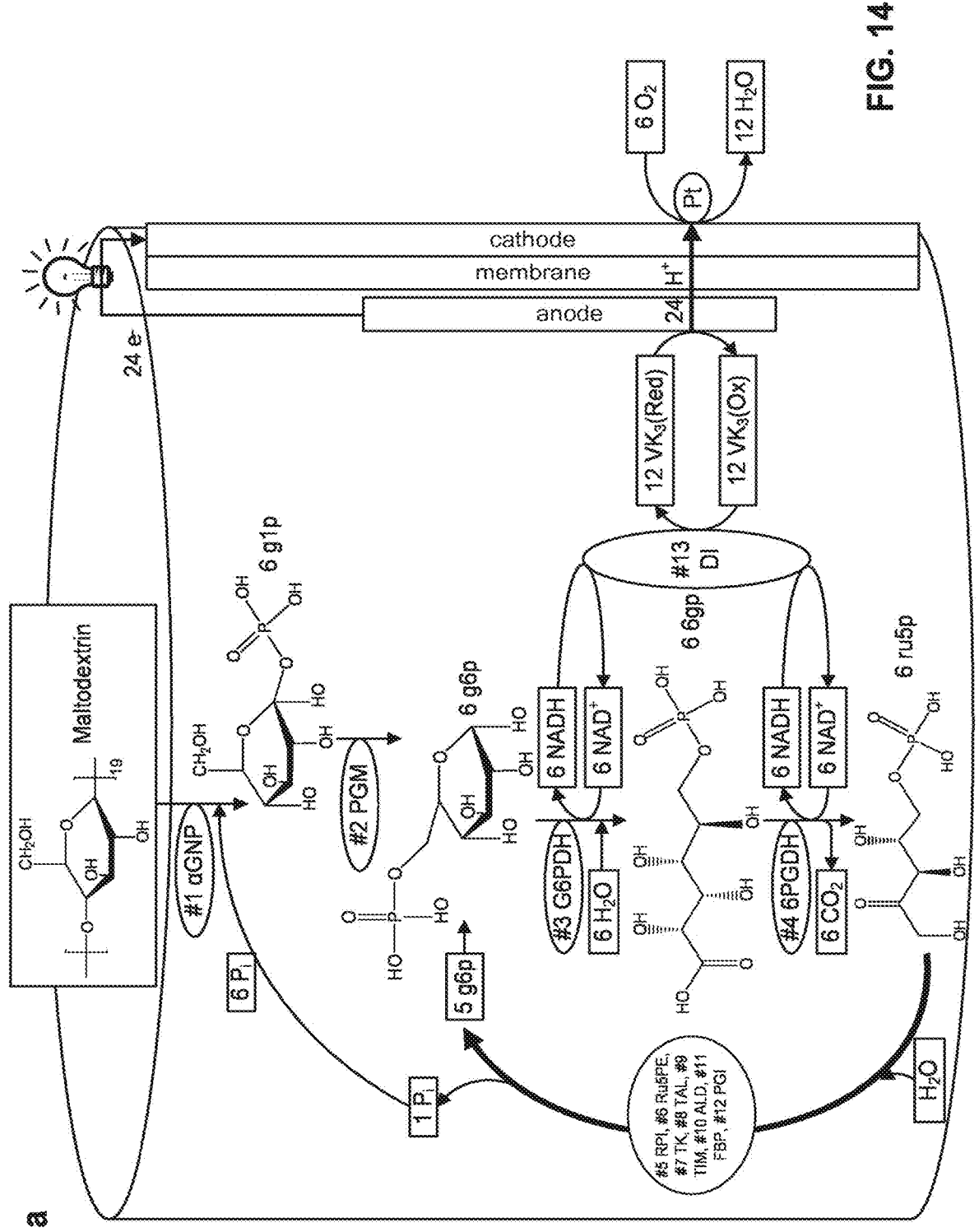

FIG. 14 is a schematic diagram showing the operation of an enzymatic fuel cell for complete oxidation of maltodextrin. The enzymes in the EFC are: #1 αGP, α-glucan phosphorylase; #2 PGM, phosphoglucomutase; #3 G6PDH, glucose-6-phosphate dehydrogenase; #4 6PGDH, 6-phosphogluconate dehydrogenase; #5 RPI, ribose 5-phosphate isomerase; #6 Ru5PE, ribulose 5-phosphate 3-epimerase; #7 TK, transketolase; #8 TAL, transaldolase; #9 TIM, triose phosphate isomerase; #10 ALD, aldolase; #11 FBP, fructose 1,6-bisphosphatase; #12 PGI, phosphoglucose isomerase; and #13 DI, diaphorase. The key metabolites are glucose 1-phosphate (G1P), glucose 6-phosphate (G6P), 6-phosphogluconate (6PG), and ribulose 5-phosphate (Ru5P). $P_i$ denotes inorganic phosphate and $VK_3$, denotes vitamin $K_3$.

Figure 15:
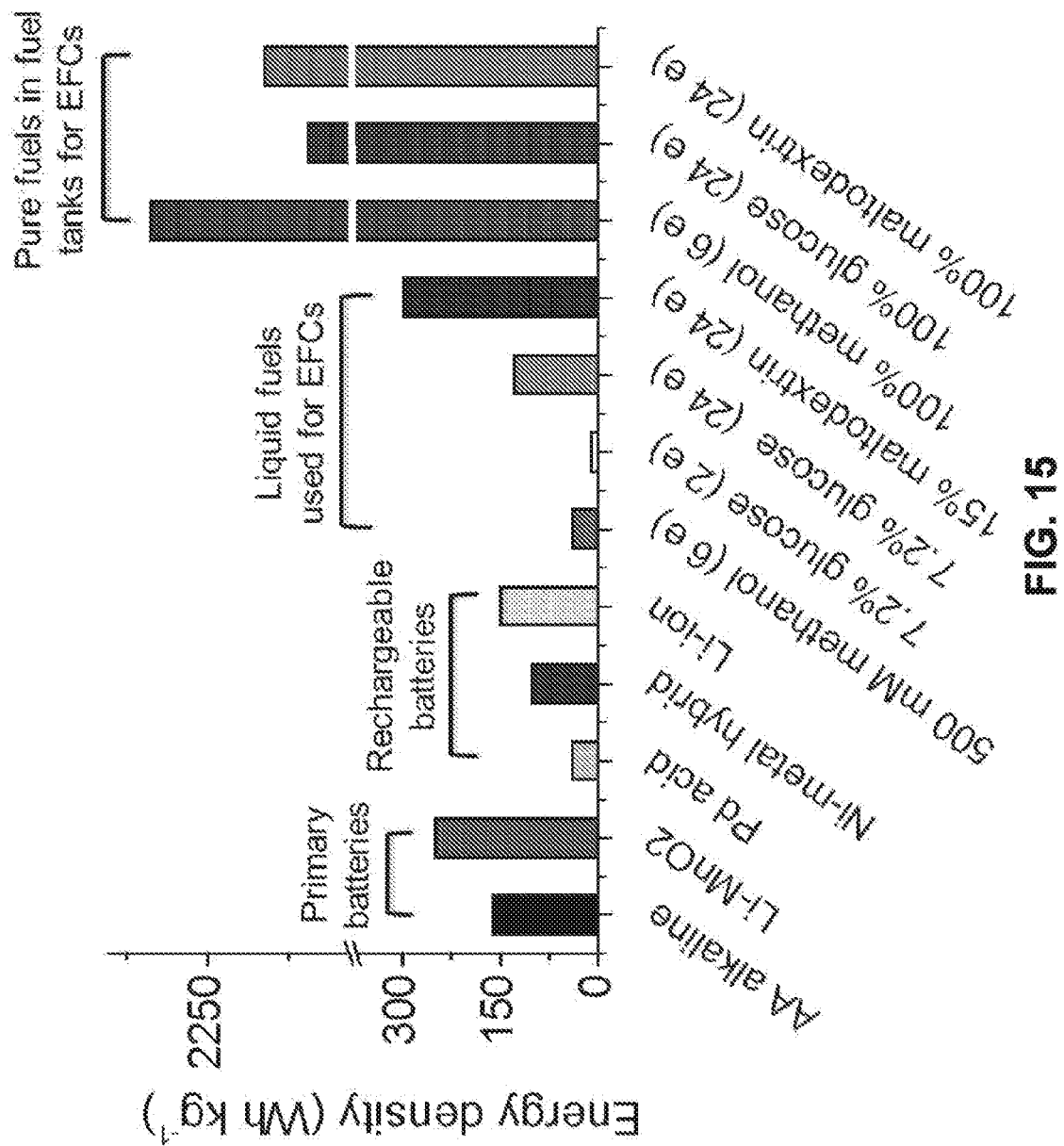

FIG. 15 is a graph showing a comparison of energy densities among batteries and enzymatic fuel cells.

Figure 16:
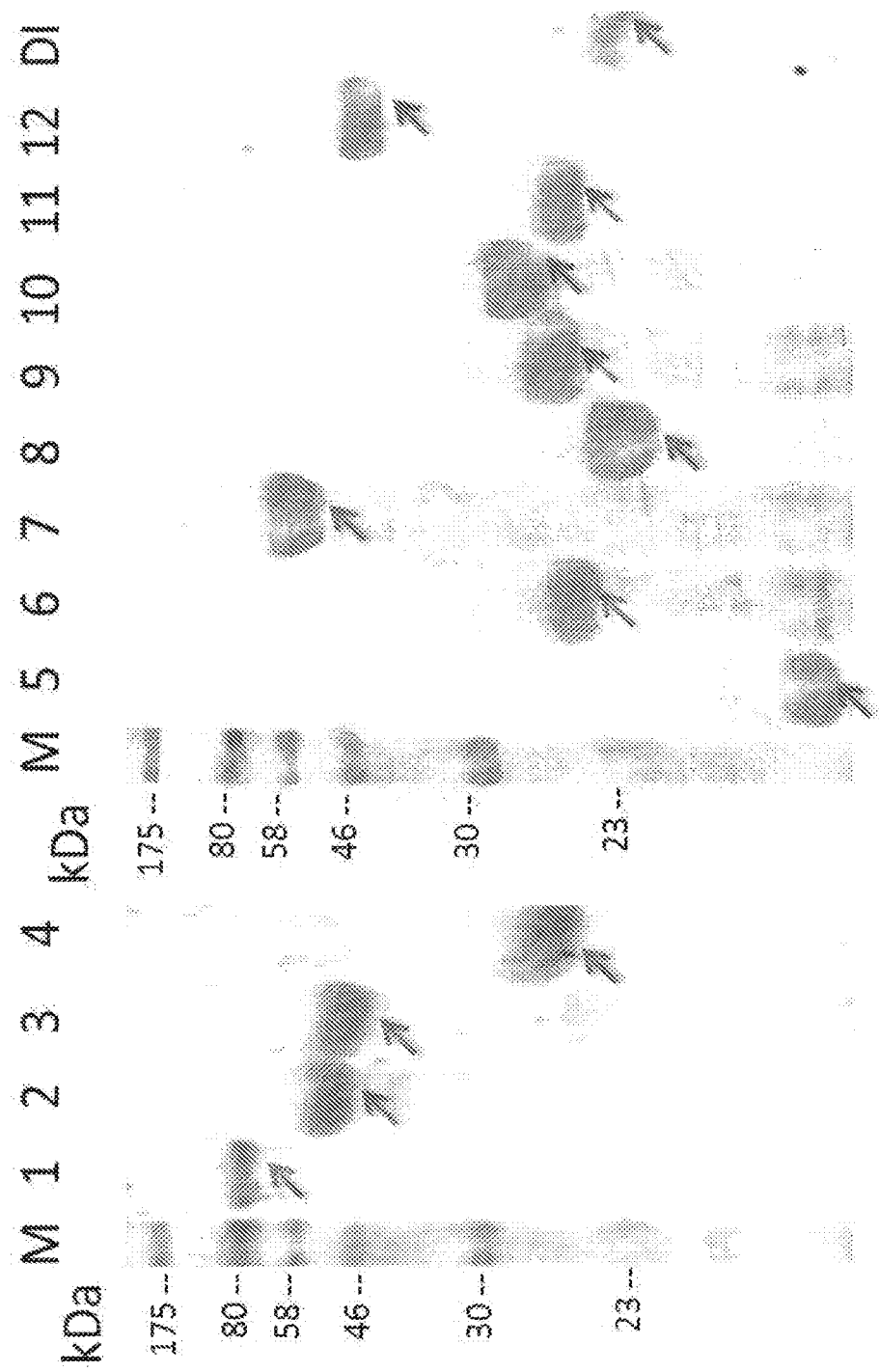

FIG. 16 is a SDS-PAGE analysis of purified enzymes. Lane 1: αGP, α-glucan phosphorylase; Lane 2: PGM, phosphoglucomutase; Lane 3: G6PDH, glucose 6-phosphate dehydrogenase; Lane 4: 6PGDH, 6-phosphogluconate dehydrogenase; Lane 5: RPI, ribose 5-phosphate isomerase; Lane 6: Ru5PE, ribulose 5-phosphate 3-epimerase; Lane 7: TK, transketolase; Lane 8: TAL, transaldolase; Lane 9: TIM, triose phosphate isomerase; Lane 10: ALD, aldolase; Lane 11: FBP, fructose 1,6-bisphosphatase; Lane 12: PGI, phosphoglucose isomerase; and DI, diaphorase.

Figure 17:
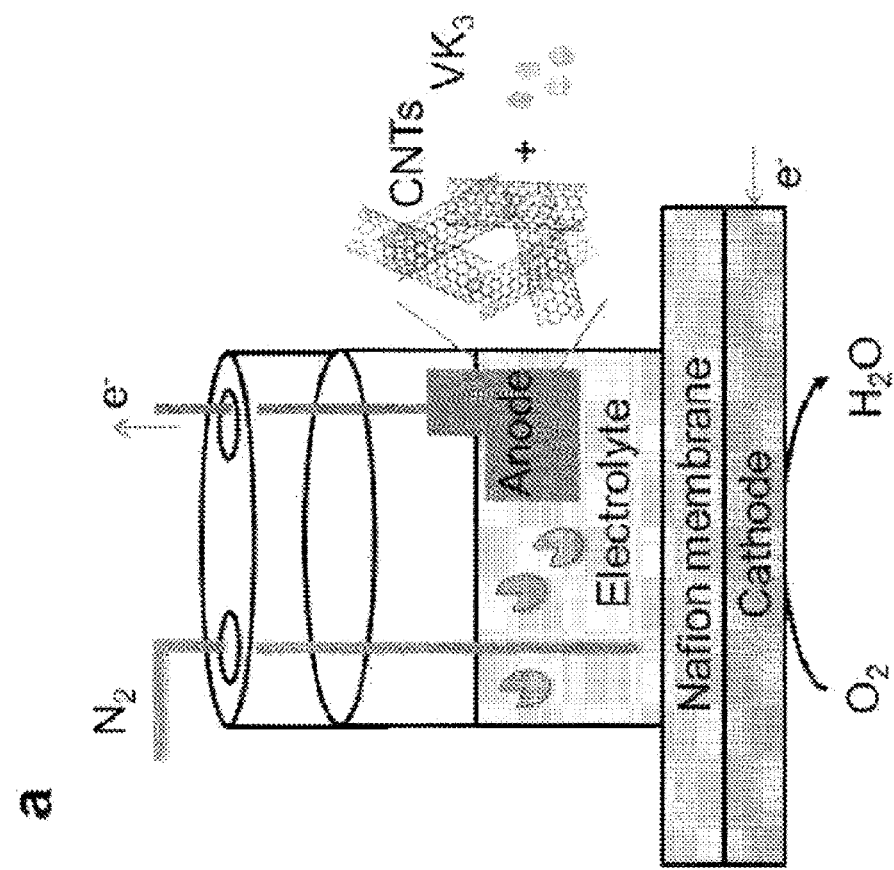
Figure 17:
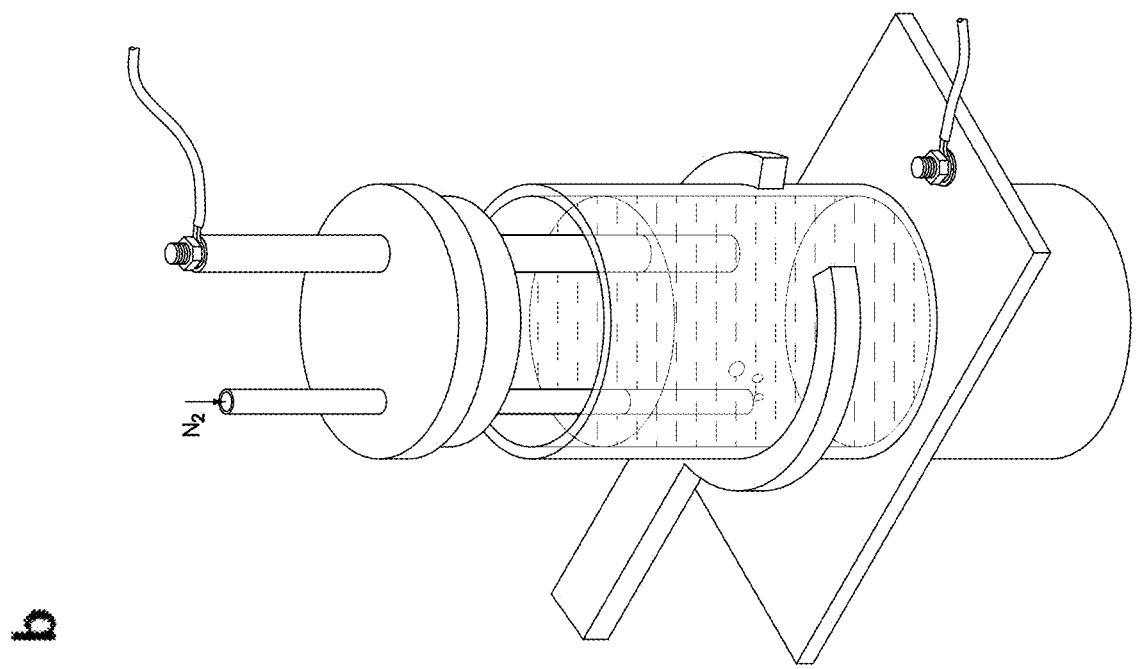

FIG. 17 shows a scheme (Panel A) and photo (Panel B) of an EFC set.

Figure 18:
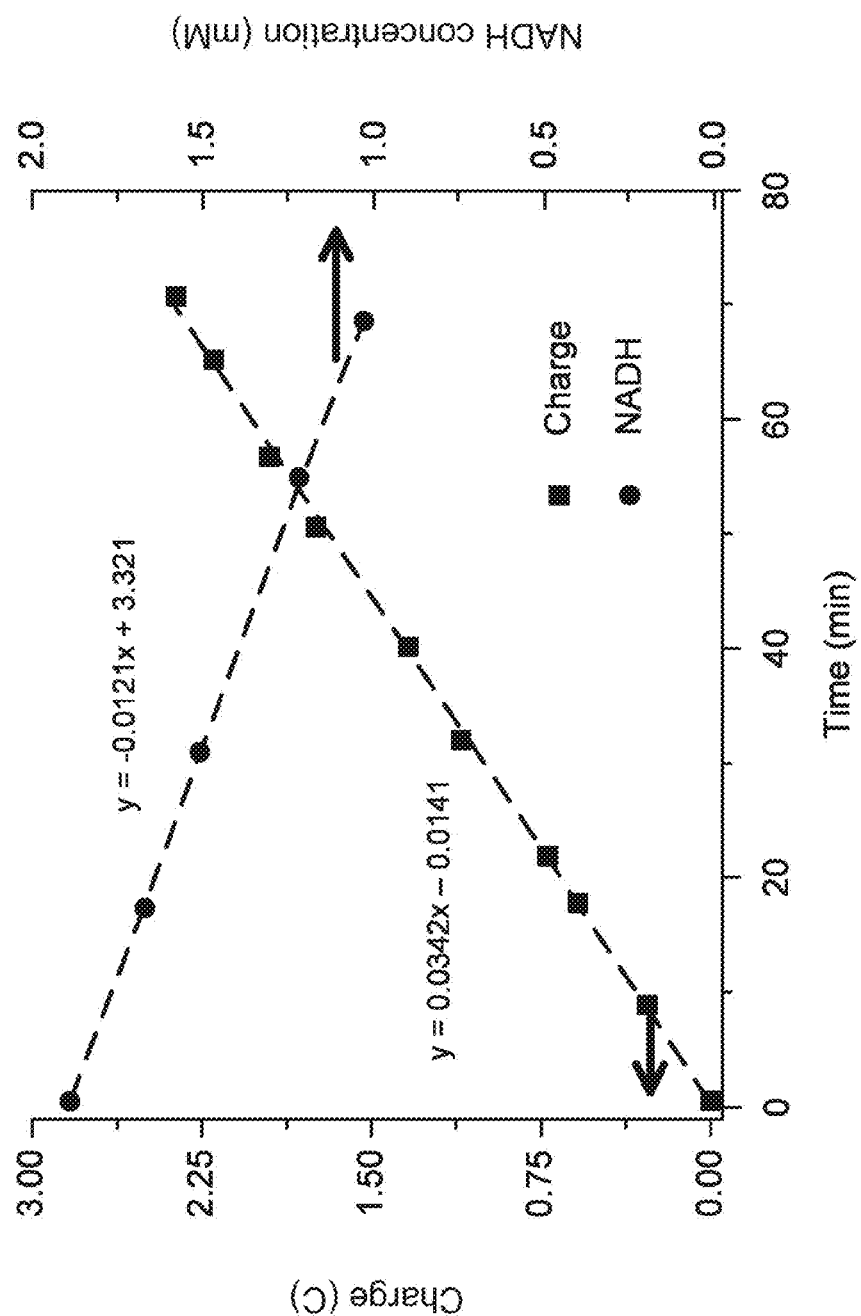

FIG. 18 is a graph showing a profile of electric charge and NADH consumption over time.

Figure 19:
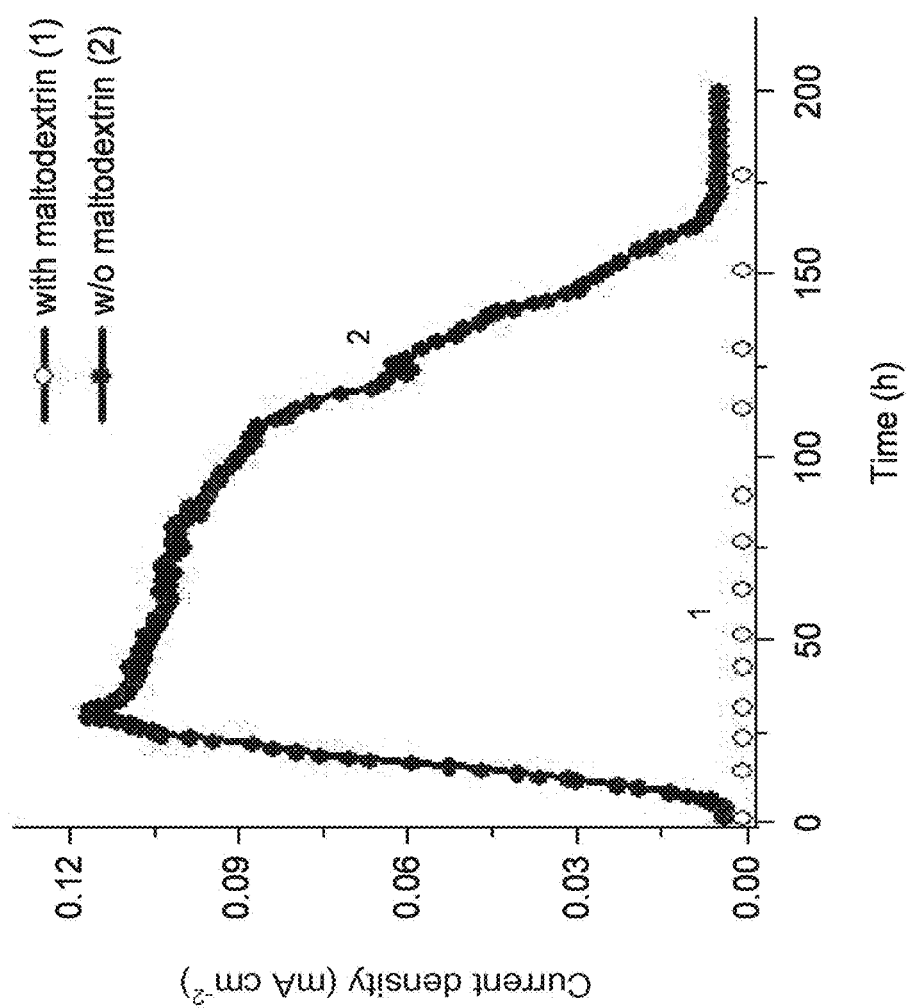

FIG. 19 is a graph showing a profile of current generation with or without maltodextrin.

Figure 20:
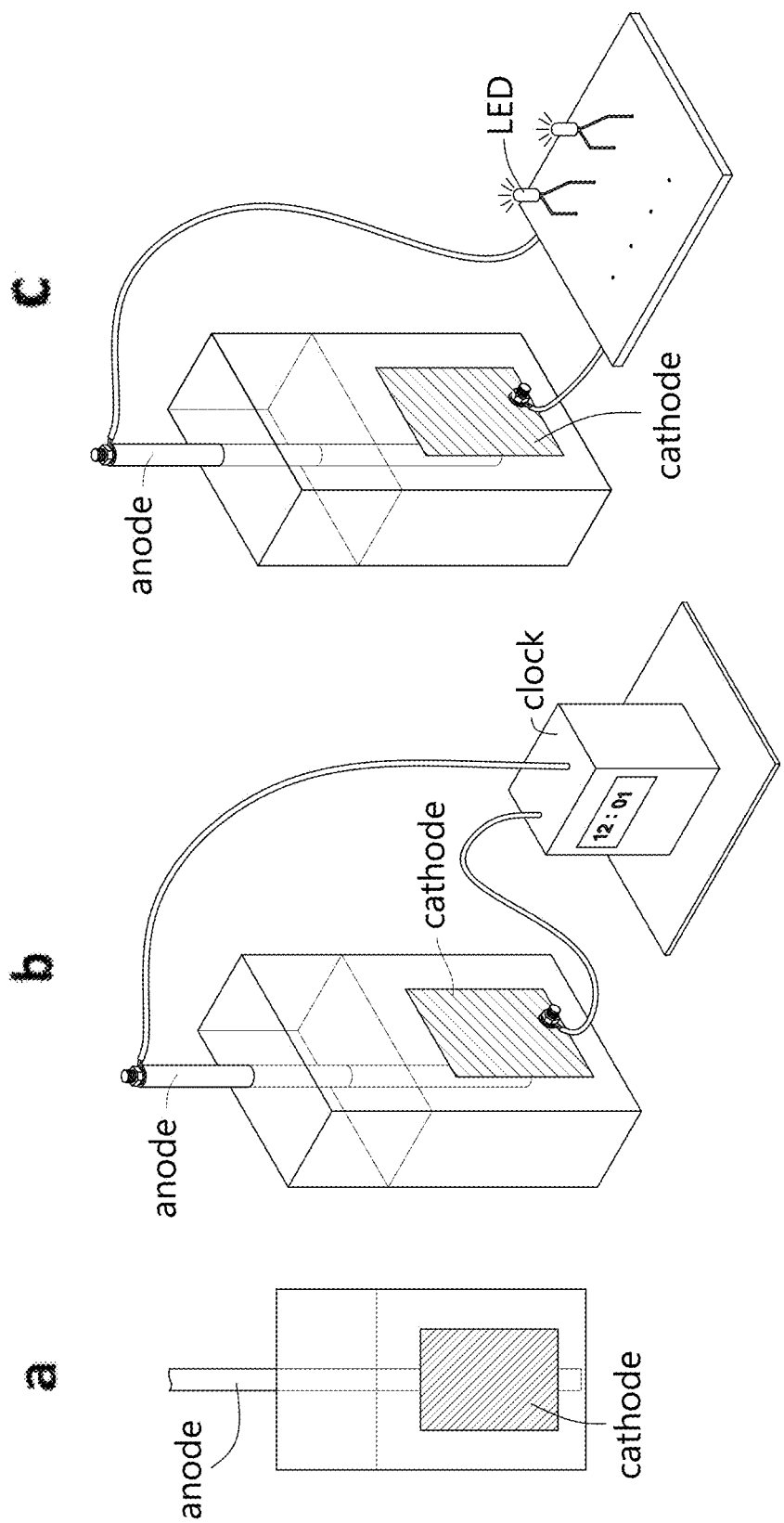

FIG. 20 is a photo of a cuvette-based EFC, showing its front view (Panel A) and two EFCs connected in series to power up a digital clock (Panel B) and a LED (Panel C).

Figure 21:
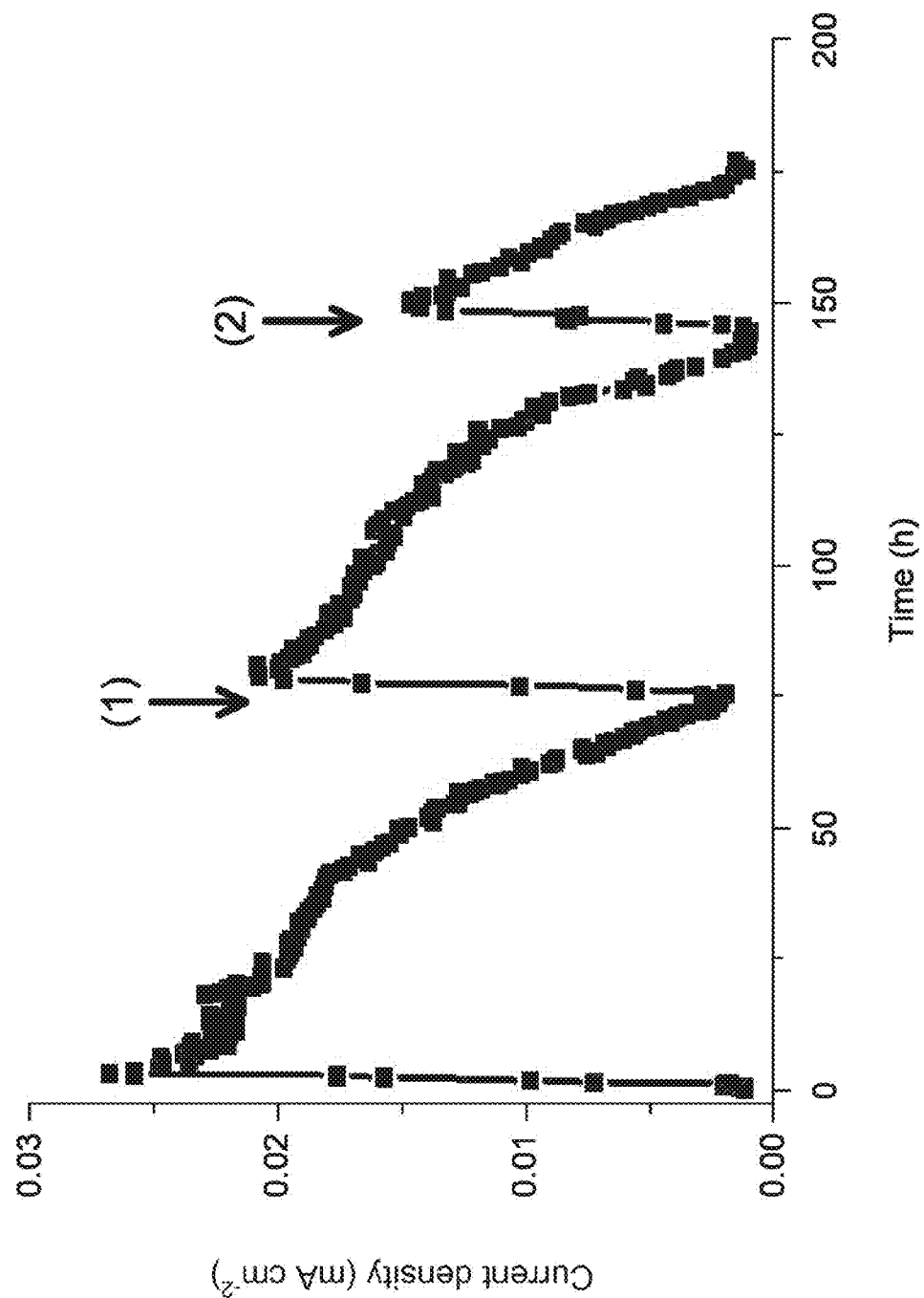

FIG. 21 is a graph showing the effect of sugar refilling on non-immobilized EFC. The initial maltodextrin concentration was 0.01 mM. At Point 1 and 2, the same amount of fresh substrate was added into the EFC.

Figure 22:
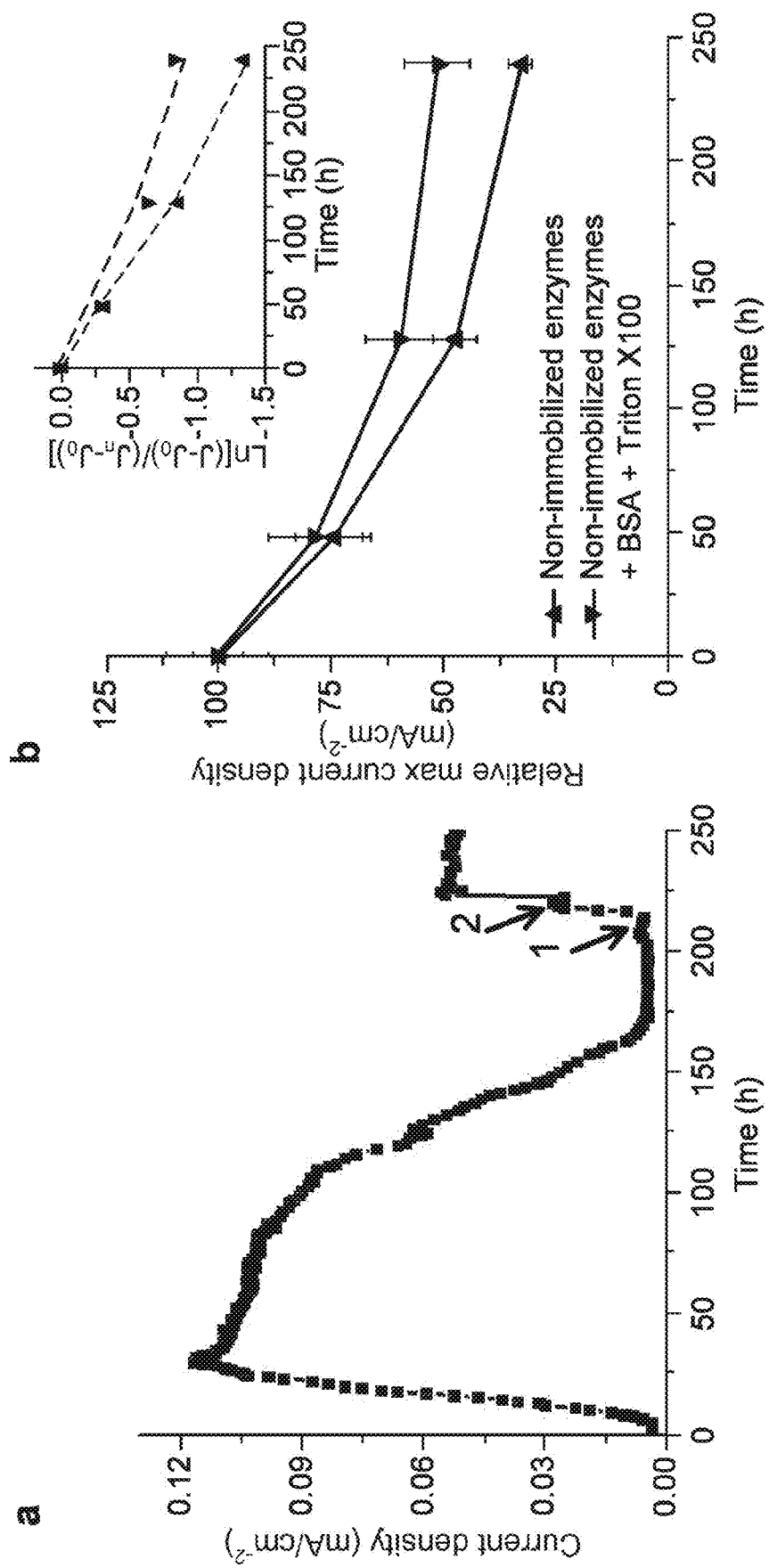

FIG. 22—Panel A is a graph showing thermostability and refillability of the entire pathway EFC (with all 13 enzymes). The current generation curve is of the 13-enzyme EFC working on 0.1 mM maltodextrin at room temperature. At Point 1 (around 210 h), the new enzyme mixture and 1 mM maltodextrin was added where the substrate was consumed nearly completely at round 200 h. At Point 2, the new $VK_3$-containing anode was used to replace the old one. Panel B is a graph showing enhancement of the stability of non-immobilized enzymes in an EFC by the addition of 1 g/L BSA and 0.1% (wt/v) Triton X-100.

DETAILED DESCRIPTION OF THE INVENTION

The present invention provides a method for converting chemical energy stored in sugars to electricity. In certain embodiments, the present invention provides synthetic (artificial) enzymatic pathways for converting chemical energy from six-carbon sugars and five-carbon sugars to electricity using enzymatic fuel cells. In a preferred embodiment of the present invention, sugar batteries are used to convert the chemical energy to electricity. One of the many advantages of the present invention is that the sugar batteries disclosed herein have an energy density that may be more than about 10-fold higher than the energy densities of the current enzymatic fuel cells and rechargeable batteries. Other advantages of the sugar batteries of the present invention include, but are not limited to, the utilization of low-cost feedstock, modest reaction conditions and low-cost catalysts (e.g., enzymes), high energy storage density, low safety concern (e.g., neither explosion nor flammability), abundant supply of all materials and catalysts, fast refilling, zero carbon emissions, environmentally friendly, and usability in a wide variety of applications.

Another advantage of the present invention is that, unlike primary and secondary batteries that suffer from low energy storage densities, the fuel cells described herein have much higher densities. Enzymatic fuel cells are a type of fuel cells that can utilize enzymes to convert chemical energy stored in chemical compounds to electricity. Six-carbon sugar monomers (e.g., glucose, fructose, mannose) and their derivatives (e.g., maltose, cellodextrins, sucrose, lactose, cellobiose, cellodextrin, cellulose, starch) and xylose and its derivatives (e.g., hemicellulose, xylan) are the most abundant carbohydrates and therefore a great source of energy. The present invention provides a number of novel non-natural synthetic enzymatic pathways that can convert these six-carbon sugars and five-carbon sugars to electricity through partial or complete oxidation mediated by a number of cascades of enzymes. Because the sugar batteries have a high energy storage density, are biodegradable and quickly refillable, and have a low explosion risk, they can successfully replace most primary batteries, secondary batteries and direct methanol fuel cells.

Figure 1:
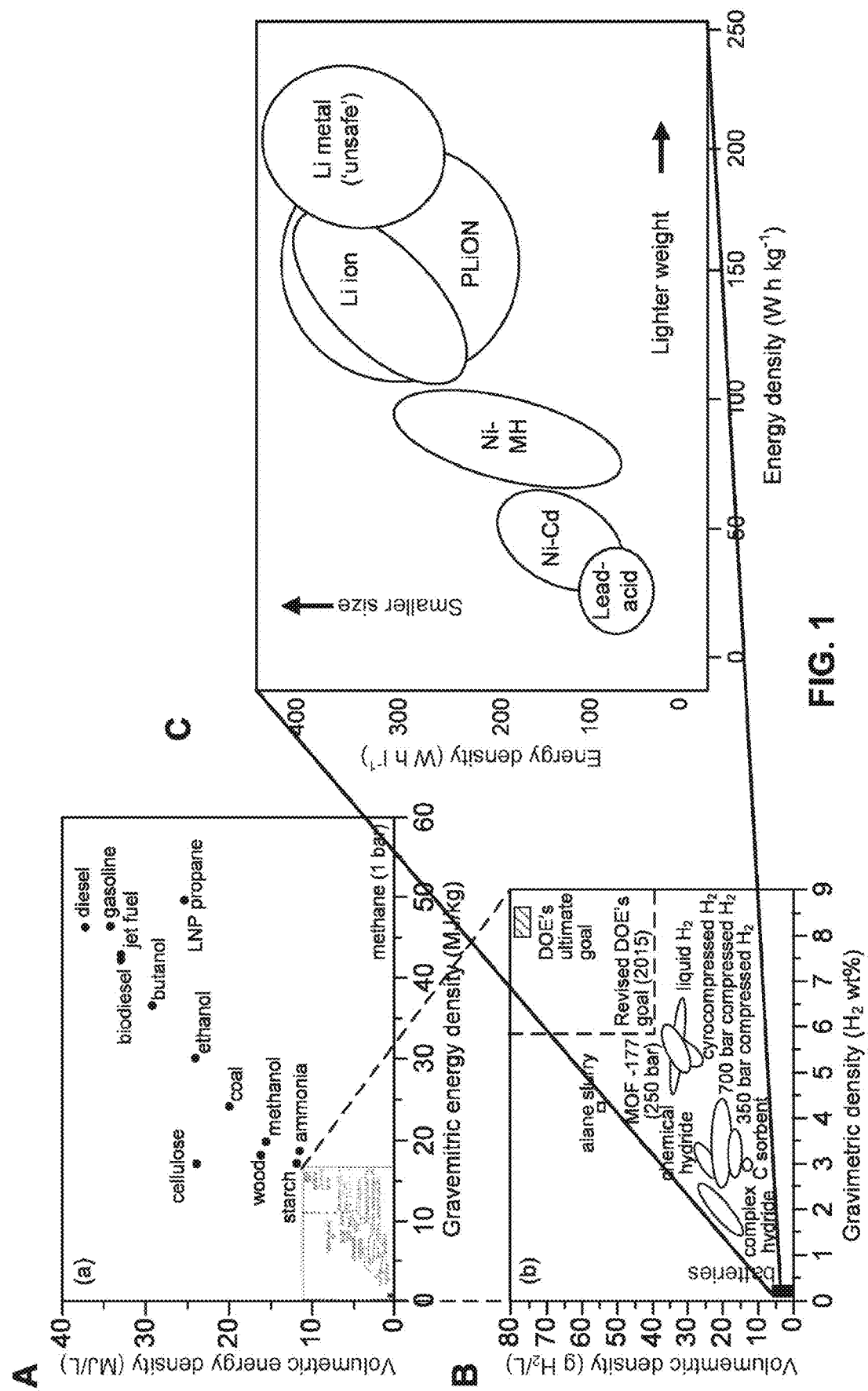
Figure 2:
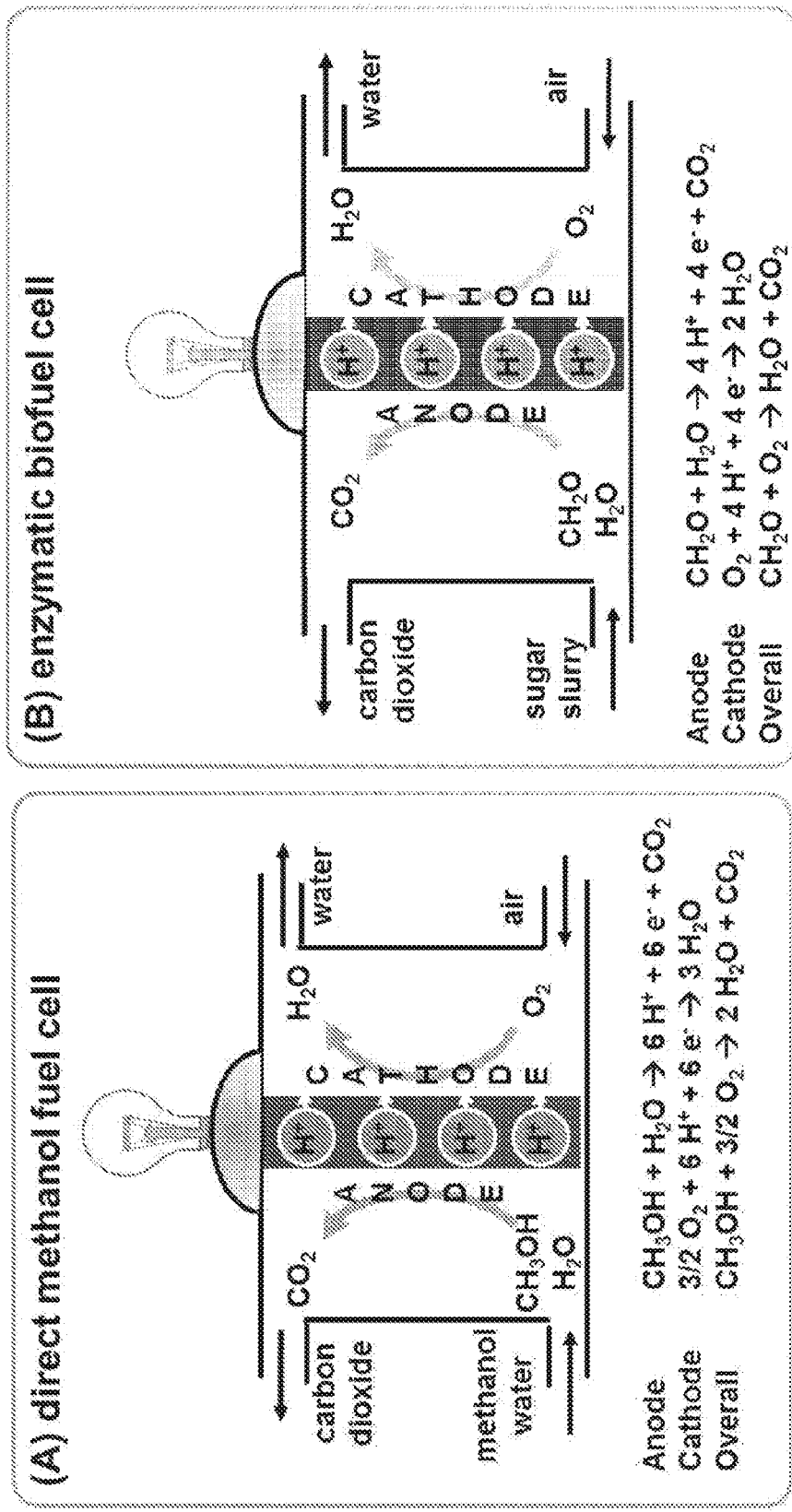
Figure 3:
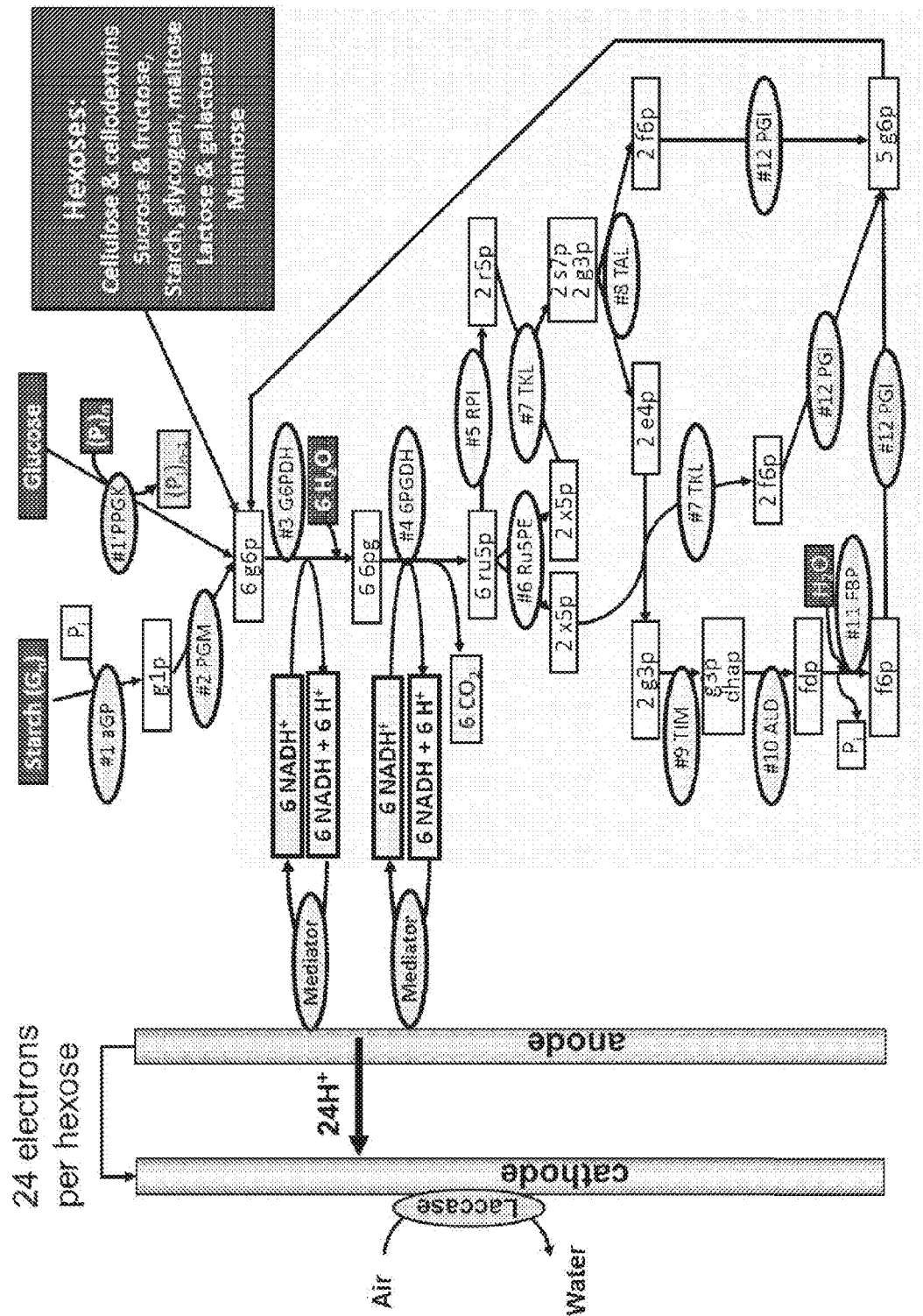
FIG. 3 is a schematic diagram showing the operation of sugar batteries containing two synthetic pathways that are capable of completely oxidizing six-carbon sugars from G-6-P which is generated from starch or glucose.
Figure 4:
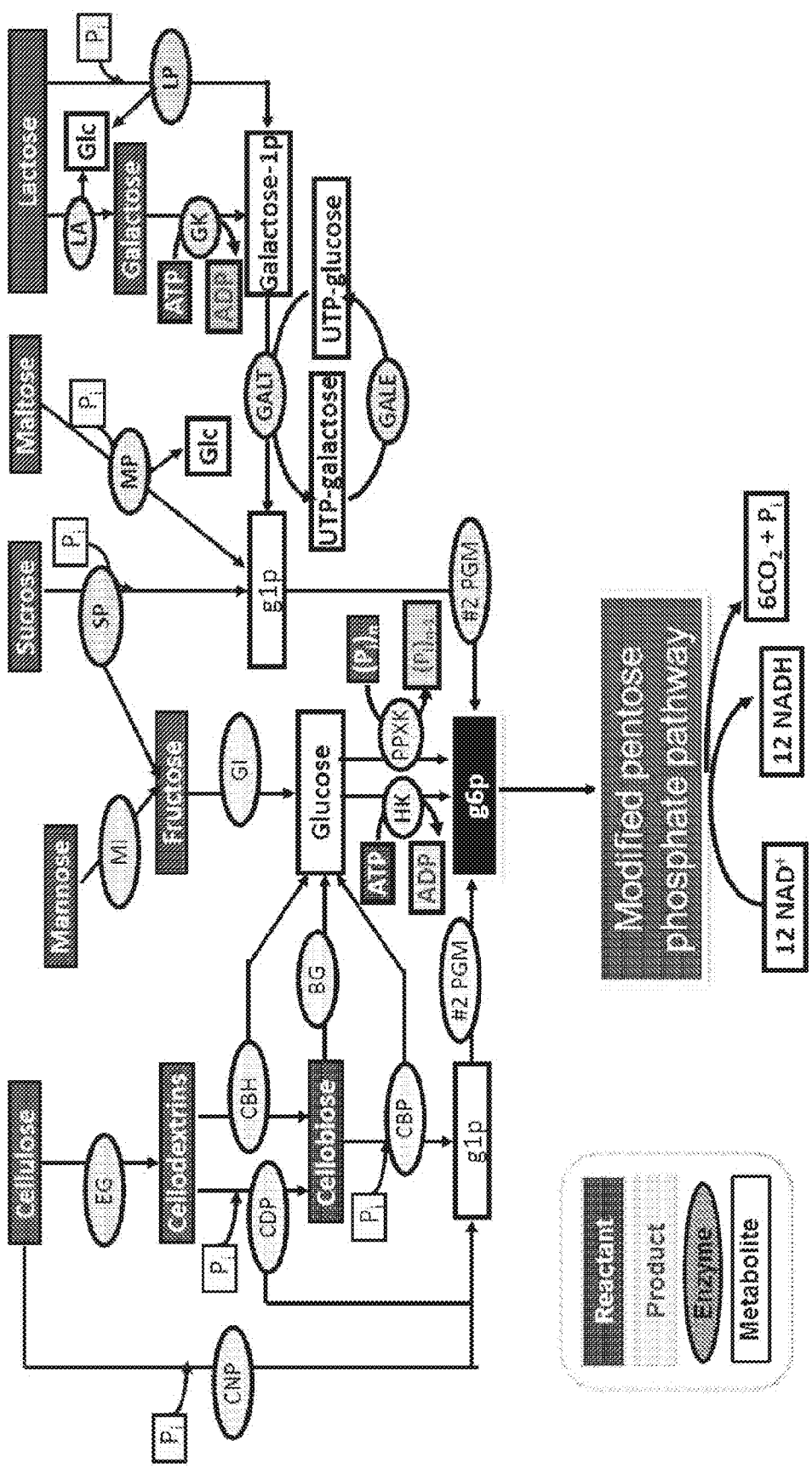
FIG. 4 is a schematic diagram showing operation of sugar batteries that are capable of generating glucose 6-phosphate (G6P) from six-carbon sugars other than starch or glucose, such as cellulose, cellodextrin, cellobiose, sucrose, maltose, lactose, lactose, mannose, or fructose.
Figure 5:
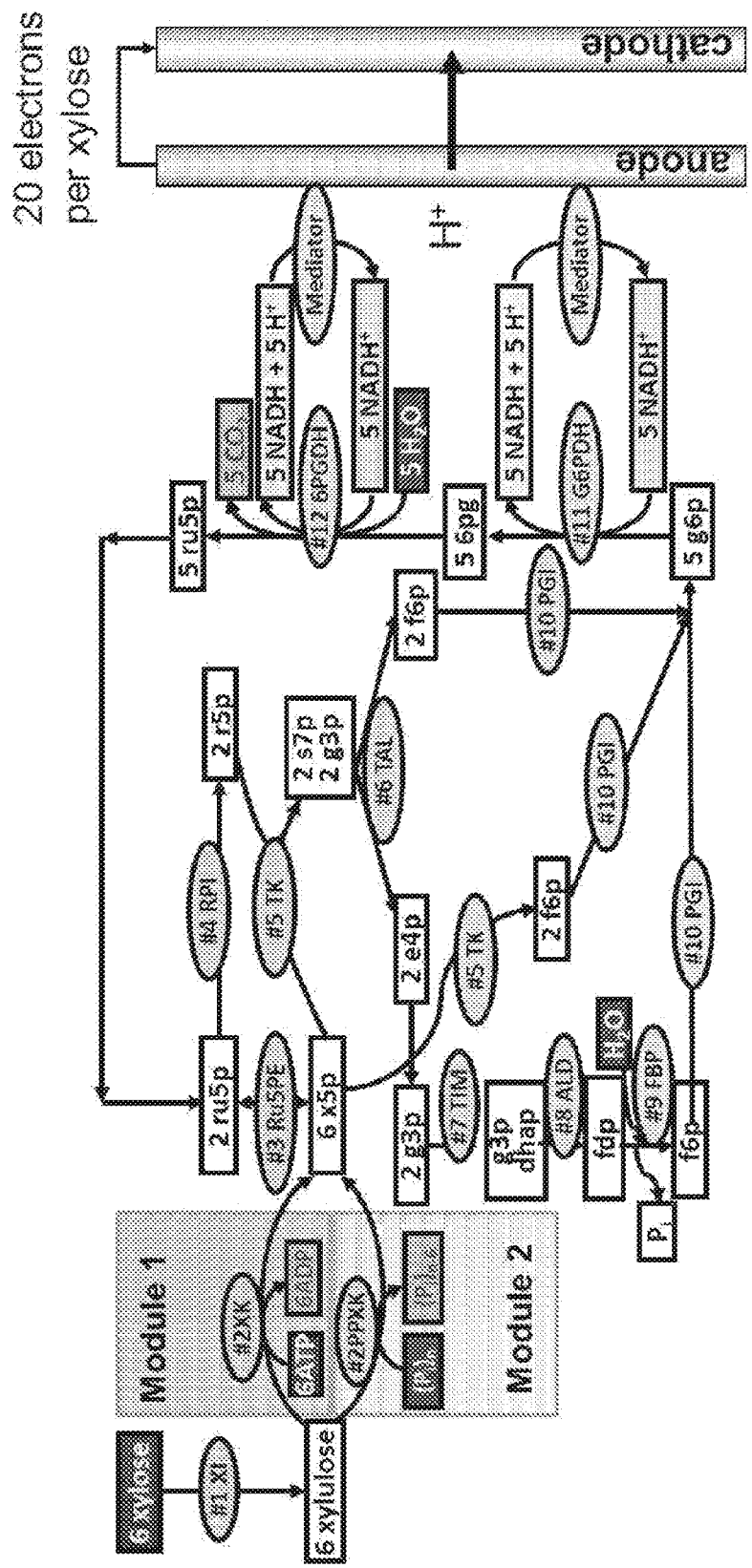
FIG. 5 is a schematic diagram showing the operation of sugar batteries that are capable of generating xylulose 5-Phosphate (X5P) from xylose by using ATP or polyphosphate.
Figure 6:
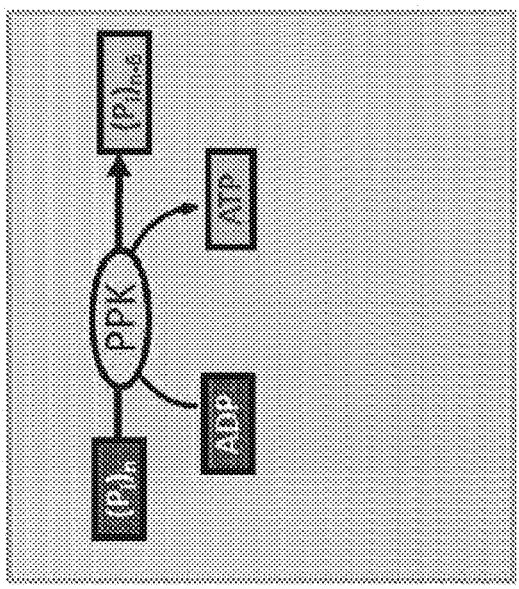
FIG. 6 is a schematic diagram showing supplementary pathways that can regenerate ATP by using low-cost polyphosphate.
Figure 6:
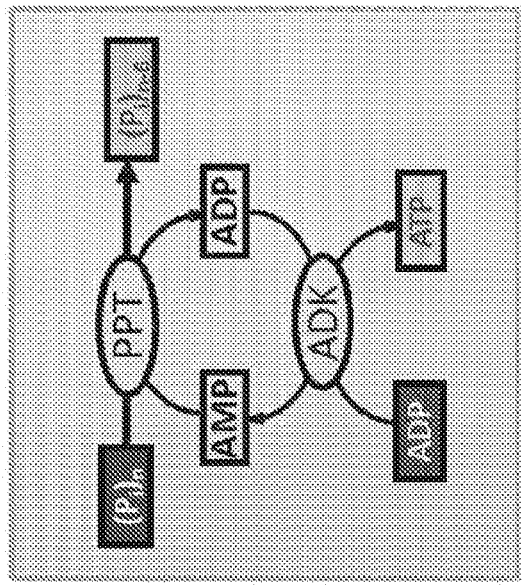

The preferred fuels for sugar batteries include six-carbon sugars from monosaccharides (e.g., glucose, mannose, fructose, and galactose), oligosaccharides (e.g., maltose, maltodextrins, sucrose, cellobiose, cellodextrins, lactose), and polysaccharides (e.g., cellulose, starch, and glycogen), D-xylose, L-arabinose, hemicellulose, xylan, and any combinations thereof. The output is electricity. A typical scheme of an exemplary sugar battery according to embodiments of the present invention is shown in FIG. 3 and FIG. 4. The present invention provides several new cascade enzymatic pathways that are capable of converting the chemical energy stored in six-carbon sugars to electricity using enzymatic fuel cells.

Starch is the most widely used energy storage compound in nature. The catabolism of starch allows for a slow and nearly constant release of chemical energy in living cells that is different from its monomer glucose. Maltodextrin, a partially hydrolyzed starch fragment, is a superior fuel to glucose in EFCs, because maltodextrin has 11% higher energy density than glucose. Maltodextrin is also less costly because glucose is the main product of its enzymatic hydrolysis, and low-cost linear maltodextrin can be made from cellulose. An equivalent weight of maltodextrin has a much lower osmotic pressure than glucose. Moreover, it can provide slowly-metabolized glucose 1-phosphate for more stable electricity generation in closed EFCs. Maltodextrin has been used as a fuel for EFCs, but only two electrons could be generated per glucose unit before this invention.

Pathways

The inventive pathways include specific enzymes for converting the stored energy of specific sugars into useful electricity. A complete utilization of the sugar fuel is possible by oxidizing G6P (glucose 6-phosphate) in the presence of $NAD^+$ or a biomimetic analogue (or biomimic) thereof. The advantages of the embodiments of the present invention include the ability to use a sugar as a starting material, and not G6P and X5P (xylulose 5-phosphate) directly. This provides for a low-cost source of G6P and X5P. The starting material (e.g., sugar as a fuel) is efficiently used, which was not achieved previously, by using a modified pentose phosphate pathway along with enzymes from the glycolysis and gluconeogenesis pathways coupled with a complete conversion of $NAD^+$ or a biomimic thereof into NADH or a biomimic thereof.

In some embodiments, the present invention provides a novel combination of enzymatic pathways for sugar batteries. In these embodiments, the novel synthetic enzymatic pathways contain three parts, referred to herein as modules. Module one generates low-cost glucose 6-phosphate from any six-carbon sugar. Module two allows NADH or a biomimic thereof to be generated from a modified pentose phosphate pathway together with enzymes from the glycolysis and gluconeogenesis pathways (G6P+7 H$_2$O+12 NAD$^+$→12 NADH+12 H$^+$+6 CO$_2$). Module 3 allows reduced NADH or a biomimic thereof to be oxidized on the surface of an anode for electron generation. FIG. 3 and Table 1 below demonstrate such a scheme.

TABLE 1

Modified Pentose Phosphate Pathway

| No. | Enzyme Name | E.C. | Reaction |
|---|---|---|---|
| 3 | NAD-based glucose 6-phosphate dehydrogenase (G6PDH) | 1.1.1.49 | G6P + NAD$^+$ → 6PG + NADH |
| 4 | NAD-based 6-phosphogluconic dehydrogenase (6PGDH) | 1.1.1.44 | 6PG + H$_2$O + NAD$^+$ → Ru5P + NADH + CO$_2$ |
| 5 | ribulose 5-phosphate 3-epimerase (Ru5PE) | 5.1.3.1 | Ru5P → X5P |
| 6 | ribose 5-phosphate isomerase (R5PI) | 5.3.1.6 | Ru5P → R5P |
| 7 | transketolase (TK) | 2.2.1.1 | X5P + R5P → S7P + G3P<br>X5P + E4P → F6P + G3P |
| 8 | transaldolase (TAL) | 2.2.1.2 | S7P + G3P → F6P + E4P |
| 9 | triose-phosphate isomerase (TPI) | 5.3.1.1 | G3P → DHAP |
| 10 | aldolase (ALD) | 4.1.2.13 | G3P + DHAP → FDP |
| 11 | fructose 1,6-bisphosphate (FBP) | 3.1.3.11 | FDP + H$_2$O → F6P + Pi |
| 12 | phosphoglucose isomerase (PGI) | 5.3.1.9 | F6P → G6P |

In one embodiment, Module I contains a single pathway as shown below. In another embodiment, Module I may contain a combination of pathways in an enzymatic fuel cell. The present invention provides pathways that can generate G6P from any monomer hexose without consumption of costly ATP by using polyphosphate as a phosphate donor, followed by its regeneration.

Pathway 1 in one embodiment, the pathway is provided as Pathway 1. Pathway 1 starts with glucose, which can be generated by simple hydrolysis or phosphorolysis of oligosaccharides and polysaccharides. G6P can be generated as "Glucose+$(P_i)_n$→G6P+$(P_i)_{n-1}$" by polyphosphate-glucokinase (PPGK, EC 2.7.1.6, polyphosphate-glucose phosphotransferase) or "Glucose+ATP→G6P+ADP" by hexokinase (HK, EC2.7.1.1), where ATP can be generated at the cost of polyphosphate as ADP+$(P_i)_n$→ATP+$(P_i)_{n-1}$ by polyphosphate kinase (PPK, EC 2.7.4.1) or a combination of polyphosphate:AMP phosphotransferase (PPT, EC 2.7.4.B2) and polyphosphate-independent adenylate kinase (ADK, EC 2.7.4.3). After the complete oxidation of G6P, free phosphate can be regenerated to produce polyphosphate by chemical or biological means.

Pathway 2

In another embodiment, the pathway is provided as Pathway 2. Pathway 2 starts with fructose. The fructose can be converted into glucose by glucose (xylose) isomerase (EC 5.3.1.5), and then glucose is processed through the above pathway (Pathway 1). In another embodiment, glucose may be generated by coupled enzymes sorbitol dehydrogenase (EC 1.1.1.14) and aldehyde reductase (EC 1.1.1.21).

Pathway 3

In another embodiment, the pathway is provided as Pathway 3. Pathway 3 starts with mannose. In one embodiment, mannose can be converted to fructose by mannose isomerase (EC 5.3.1.7), and then fructose is processed through Pathway 2. In another embodiment, mannose can be converted to fructose 6-phosphate by two enzymes (polyphosphate-glucose mannose phosphotransferase, EC 2.7.1.63 and phosphomannose isomerase, EC 5.3.1.8), and then fructose 6-phosphate is processed through a modified pentose phosphate pathway (modified PPP) together with enzymes from the glycolysis and gluconeogenesis pathways. In another embodiment, fructose 6-phopshate is generated by using three enzymes—polyphosphate kinase (EC 2.7.4.1), hexokinase (EC 2.7.1.1) and phosphomannose isomerase (EC 5.3.1.8), resulting in the overall reaction of mannose+$(P_i)_n$→fructose 6-phosphate+$(P_i)_{n-1}$.

Pathway 4

In another embodiment, the pathway is provided as Pathway 4. Pathway 4 starts with galactose. Five enzymes together convert galactose to glucose 6-phopshate in the overall reaction of: galactose+$(P_i)_n$→glucose 6-phosphate+$(P_i)_{n-1}$. These five enzymes are polyphosphate kinase (EC 2.7.4.1), galactokinase (EC 2.7.16), UDP-glucose-hexose-1-phosphate uridylyltransferase (EC 2.7.7.12), UDP-galactose-4-epimerase (EC 5.1.3.2), and phosphoglucomutase (EC 5.4.2.2).

Polyphosphate regeneration can be performed by chemical and/or biological approaches. Free phosphate ion can be precipitated by forming insoluble salts including, but not limited to, Mg$_3$(PO4)$_2$ and Ca$_3$(PO4)$_2$. Polyphosphate can be made by adding concentrated H$_2$SO$_4$, followed by heating. Alternatively, *Microlunatus phosphovorus* takes up free phosphate and accumulates polyphosphate intracellularly under glucose-limited conditions.

The present invention provides pathways that can generate G6P from oligosaccharide without consumption of costly ATP by using polyphosphate and its regeneration and substrate phophosphorylation by using respective phosphorylases.

Pathway 5

In another embodiment, the pathway is provided as Pathway 5. Pathway 5 starts with maltodextrin. Maltodextrin with DP (Degree of Polymerization)=n can be converted to (n−1) glucose-1-phosphate and glucose by maltodextrin phosphorylase (EC 2.4.1.1) and maltose phosphorylase (EC 2.4.1.8). Glucose 1-phosphate is produced by phosphoglucomutase (EC 5.4.2.2) followed by the PPP with enzymes from the glycolysis and gluconeogenesis pathways, and glucose is processed through Pathway 1.

Pathway 6

In another embodiment, the pathway is provided as Pathway 6. Pathway 6 starts with sucrose. Sucrose can be converted to glucose 1-phosphate and fructose by sucrose phosphorylase (EC2.4.1.7). The fructose and glucose 1-phosphate may be processed through Pathway 2 and by phosphoglucomutase (EC 5.4.2.2), respectively.

Pathway 7

In another embodiment, the pathway is provided as Pathway 7. Pathway 7 starts with water-soluble cellodextrins, including, but not limited to, cellobiose and cellodextrins. Cellodextrins with DP=n can be converted to (n−1) glucose 1-phosphate and glucose by cellobiose phosphorylase (EC 2.4.1.20) and cellodextrin phosphorylase (EC 2.4.1.49). The remaining pathway may be the same as Pathway 5.

The present invention provides various exemplary pathways that can generate monomeric hexoses from oligosaccharides or polysaccharides after hydrolysis, which are then processed by Pathways 1-7.

Pathway 8

In another embodiment, the pathway is provided as Pathway 8. Pathway 8 starts with sucrose. Sucrose can be hydrolyzed to glucose and fructose by sucrase (EC 3.2.1.10). The products may enter Pathways 1 and 2, respectively.

Pathway 9

In another embodiment, the pathway is provided as Pathway 9. Pathway 9 starts with lactose. In one embodiment, lactose can be hydrolyzed to glucose and galactose by lactase (EC 3.2.1.23). In another embodiment, lactose can be phosphorolyzed to galactose 1-phosphate and glucose by lactose phosphorylase. The products may enter Pathways 1 and 4.

Pathway 10

In another embodiment, the pathway is provided as Pathway 10. Pathway 10 starts with starch, glycogen, maltose or maltodextrins. The starch or glycogen can be partially hydrolyzed to maltodextrins and maltose by using alpha-amylase (EC 3.2.1.1) and other starch hydrolyzing enzymes, such as isoamylase (EC3.2.1.68), pullulanase (EC3.2.1.41). The starch, maltose or maltodextrin can be hydrolyzed to glucose by glucoamylase (EC 3.2.1.3), alpha-amylase (EC 3.2.1.1), and other starch hydrolyzing enzymes. Glucose may enter Pathway 1.

Pathway 11

In another embodiment, the pathway is provided as Pathway 11. Pathway 11 starts with insoluble cellulose or pretreated biomass. The insoluble cellulose or pretreated biomass can be hydrolyzed to soluble cellodextrins by individual endoglucanase (EC 3.2.1.4) and/or cellobiohydrolase (EC 3.2.1.74) or a combination thereof. The products of soluble cellodextrins and glucose may enter Pathways 1 and 7.

The present invention provides pathways that can generate glucose 1-phosphate from polysaccharides (starch, cellulose, or glycogen) and may be phosphorolyzed by their respective glucan phosphorylases and accessory enzymes.

Pathway 12

In another embodiment, the pathway is provided as Pathway 12. Pathway 12 starts with linear starch (amylose) or their short-fragments with DP=n. (n−1) glucose 1-phosphate and glucose may be generated from starch and free phosphate by starch phosphorylase (EC 2.4.1.1) and maltose phosphorylase (EC 2.4.18). After the conversion of glucose 1-phosphate to glucose 6-phosphate by phosphoglucomutase, G6P enters the PPP for electricity generation.

Pathway 13

In another embodiment, the pathway is provided as Pathway 13. Pathway 13 starts with branched starch (amylopectin) or glycogen. Most glucose units in the linear chains may be removed to generate glucose 1-phosphate by starch or glycogen phosphorylase (EC 2.4.1.1). At the end of branch points, starch debranching, enzymes or pullulanases (EC 3.2.1.41) can be used to enhance further conversion. The minor product, glucose, can be used to generate G6P through Pathway 1.

The present invention provides pathways that utilize xylose and ATP or polyphosphate to generate xylulose 5-phosphate, which will be converted to G6P through the pentose phosphate pathway and enzymes in glycolysis and gluconeogenesis. Then G6P is consumed to generate NADH or a biomimic thereof through Pathway 1.

Pathway 14

In another embodiment, the pathway is provided as Pathway 14. Pathway 14 starts with xylose. Xylose is converted to xylulose by xylose isomerase (XI, EC 5.3.1.5), and then to xylulose 5-phosphate by xylulokinase (XK, EC 2.7.1.17) by using ATP. ATP can be regenerated as ADP+$(P_i)_n$→ATP+$(P_i)_{n-1}$ by polyphosphate kinase (PPK, EC 2.7.4.1) or a combination of polyphosphate:AMP phosphotransferase (PPT, EC 2.7.4.B2) and polyphosphate-independent adenylate kinase (ADK, EC 2.7.4.3). The product xylulose 5-phosphate can be converted to G6P through the non-oxidative pentose phosphate pathway. Then G6P is consumed to generate NADH or a biomimic thereof through Pathway 1.

Pathway 15

In another embodiment, the pathway is provided as Pathway 15. Pathway 15 starts with xylose. Xylose is converted to xylulose by xylose isomerase (XI, EC 5.3.1.5), and then to xylulose 5-phosphate by polyphosphate xylulokinase (PPXK, EC NA) by using polyphosphate. The product xylulose 5-phosphate can be converted to G6P through the non-oxidative pentose phosphate pathway. Then G6P is consumed to generate NADH or a biomimic thereof through Pathway 1.

Xylulokinase is an enzyme responsible for converting xylulose to xylulose-5-phophosphate with help of ATP. We discovered a wild-type *T. maritima* xylulokinase has a promiscuous activity by utilizing polyphosphate rather than ATP as a phosphate donor. As a result, Pathway 15 can work directly.

In some embodiments, the synthetic pathway is comprised of four functional modules: glucose 6-phosphate (G6P) generation from maltodextrin mediated by alpha-glucan phosphorylase and phosphoglucomutase (Equation 1); 2 NADH generated from G6P mediated by two NAD-dependent G6PDH and 6-phosphogluconate dehydrogenase (6PGDH) (Equation 2); NADH electro-oxidation through DI to $VK_3$ that generates 2 electrons per NADH (Equation 3); and 5/6 moles of G6P regeneration from one mole of ribulose 5-phosphate via a hybrid pathway comprising enzymes in the pentose phosphate, glycolysis, and gluconeogenesis pathways (Equation 4). The overall anode reaction for the combination of Equations 1-4 approximately results in Equation 5. Clearly, each glucose unit from maltodextrin can generate 24 electrons on the anode via this de novo pathway (Equation 5).

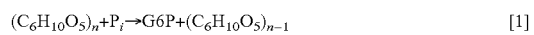

$$(C_6H_{10}O_5)_n + P_i \rightarrow G6P + (C_6H_{10}O_5)_{n-1} \quad [1]$$

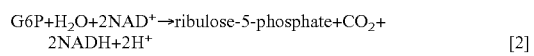

$$G6P + H_2O + 2NAD^+ \rightarrow \text{ribulose-5-phosphate} + CO_2 + 2NADH + 2H^+ \quad [2]$$

$$NADH + H^+ \rightarrow 2H^+ + 2e^- \quad [3]$$

$$6 \text{ ribulose-5-phosphate} + H_2O \rightarrow 5 \text{ G6P} + \text{phosphate} \quad [4]$$

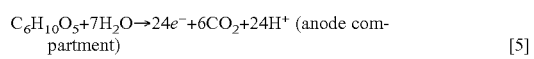

$$C_6H_{10}O_5 + 7H_2O \rightarrow 24e^- + 6CO_2 + 24H^+ \text{ (anode compartment)} \quad [5]$$

The pathway utilizes two NAD-dependent G6PDH and 6PGDH to generate NADH differently from natural NADP-dependent enzymes in the pentose phosphate pathway used for anabolism. The above pathway does not require either ATP or CoA, which are very costly and unstable in EFCs. Moreover, phosphate ions can be recycled to maintain constant pH and ion concentrations. This cyclic pathway design is different from the linear pathways typically used in EFCs.

Enzymes

In some embodiments, enzymes are immobilized using a variety of methods, including gel entrapment, physical adsorption, chemical covalent linking, and immobilization with nanoparticics and nanotubes. These methods originated from biosensors that focus on achieving reproducible signals by immobilizing commercially available mesophilic enzymes to enhance their stability without concern for slow reaction rates.

However, enzymes immobilized on the surface of solid electrodes generally exhibit much lower activities (e.g., 1%)

due to enzyme deactivation and poor fuel transfer from the bulk solutions to the immobilized enzymes. To achieve constant high-power EFCs, we considered an alternative strategy for mediating electron transfer in the EFCs without immobilizing the enzymes. Our strategy retains the enzymatic activity and facilitates mass transfer by immobilizing the electron mediator (that is, vitamin $K_3$ ($VK_3$)) on the surface of the electrode (FIG. 13, Panel C).

Two typical enzyme immobilization approaches for EFCs are polymer matrix entrapment in a quaternary tetrabutylammonium bromide (TBAB)-modified Nafion and covalent binding on carbon nanotubes (CNTs) (FIG. 13, Panels A and B).

The stability of enzymes can be addressed by the use of thermoenzymes. The thermoenzymes may be produced in *E. coli* and purified by three methods: heat precipitation, His-tag/nickel charged resin, and adsorption of cellulose-binding module tagged proteins on a cellulosic adsorbent (FIG. 16 and Table 2). Relatively non-stable thermoenzymes, such as PGI, uGP, and PGM, isolated from thermophiles can be replaced with enzymes from hyperthermophiles or engineered mutants enzymes generated by protein engineering (i.e., rational design, directed evolution or a combination of methods).

The half-life time of the non-immobilized enzymes may be increased by adding bovine serum albumin and 0.1% Triton X-100. (FIG. 22, Panel B)

Electron Mediators

In some embodiments, an electron mediator is immobilized on the surface of the anode.

In a particular embodiment, the electron mediator is vitamin $K_3$.

In some embodiments, an electron mediator is not immobilized on the surface of the anode. In other embodiments, an electron mediator is free in the anode compartment.

In a particular embodiment, the electron mediator is benzyl viologen.

Sugar Batteries or Sugar EFCs

In some embodiments, the EFC is a cuvette-based EFC (FIG. 20). Because the weight of the combined electrode materials, the plastic cuvette, and the membrane electrode assembly accounts for approximately 20% of the entire device weight. Such biobatteries may be regarded as environmentally friendly disposable primary batteries because they have better energy densities and less environmental impact. In some embodiments, a stack of two cuvette-based EFCs can power a digital clock and a LED light (FIG. 20).

In some embodiments, the biobatteries equipped with non-immobilized enzyme cascades might be refilled by the addition of the sugar solution because the sole gaseous product ($CO_2$) can be easily released from the anode compartment and the non-immobilized enzymes are not washed out of the EFCs. In other embodiments, the EFCs are refilled by the addition of the substrate and enzyme mixture.

Alternative Uses:

This invention can be used to remove extra reduced NADH or an equivalent (biomimic) thereof in a cell-free biocatalysis and make cofactor balanced.

EXAMPLES

Materials and Methods

Chemicals

All chemicals, including maltodextrin (dextrose equivalent of 4.0-7.0, i.e., a measured degree of polymerization of 19), vitamin $K_3$ ($VK_3$), nicotinamide adenine dinucleotide (NAD, including both the oxidized form ($NAD^+$) and the reduced form (NADH)), poly-L-lysine (PLL, MW ~70-150 kDa), dithiothreitol (DTT), 1-(3-dimethylaminopropyl)-3-ethylcarbodiimide hydrochloride (EDC), and N-hydroxysuccinimide (NHS) were reagent grade or higher and purchased from Sigma-Aldrich (St. Louis, Mo., USA) or Fisher Scientific (Pittsburgh, Pa., USA), unless otherwise noted. Restriction enzymes, T4 ligase, and Phusion DNA polymerase were purchased from New England Biolabs (Ipswich, Mass., USA). Oligonucleotides were synthesized either by Integrated DNA Technologies (Coraville, Iowa, USA) or Fisher Scientific. The carbon paper (AvCarb MGL200) used in the anodes was purchased from Fuel Cell Earth (Stoneham, Mass., USA). Membrane electrode assemblies (MEAs) consisting of Nafion 212 membranes and a carbon cloth cathode modified with 0.5 mg $cm^{-2}$ Pt were purchased from Fuel Cell Store (San Diego, Calif., USA). COOH-functionalized multi-wall carbon nanotubes (CNTs) with an outer diameter of <8 nm and a length of 10-30 μm were purchased from CheapTubes.com (Brattleboro, Va., USA). Regenerated amorphous cellulose used in enzyme purification was prepared from Avicel PH105 (FMC, Philadelphia, Pa., USA) through its dissolution and regeneration, as described elsewhere. *Escherichia coli* Top10 was used as a host cell for DNA manipulation and *E. coli* BL21 Star (DE3) (Invitrogen, Carlsbad, Calif., USA) was used as a host cell for recombinant protein expression. Luria-Bertani (LB) medium including either 100 mg $L^{-1}$ ampicillin or 50 mg $L^{-1}$ kanamycin was used for *E. coli* cell growth and recombinant protein expression.

Production and Purification of Recombinant Enzymes

The *E. coli* BL21 Star (DE3) strain harboring a protein expression plasmid was incubated in a 1-L Erlenmeyer flask with 250 mL of the LB medium containing either 100 mg $L^{-1}$ ampicillin or 50 mg $L^{-1}$ kanamycin. Cells were grown at 37° C. with rotary shaking at 250 rpm until the absorbance of the cell culture at 600 nm reached 0.6-0.8. Protein expression was induced by adding 100 μM of isopropyl-β-D-thiogalactopyranoside (IPTG) during an 18° C. overnight incubation. The cells were harvested by centrifugation at 4° C. and washed once with 20 mM HEPES (pH 7.5) containing 0.3 M NaCl. The cell pellets were resuspended in the same buffer and lysed by ultra-sonication (Fisher Scientific Sonic Dismembrator Model 500; 5-s pulse on and off, total 300 s at 50% amplitude). After centrifugation, the target proteins in the supernatants were purified.

Three approaches shown in (Table 2) were used to purify the various recombinant proteins. His-tagged proteins were purified by the Profinity IMAC Ni-Charged Resin (Bio-Rad, Hercules, Calif., USA). Fusion proteins containing a cellulose-binding-module (CBM) and self-cleavage intein were purified through high-affinity adsorption on a large surface-area regenerated amorphous cellulose. Heat precipitation at 80° C. for 20 min was used to purify RPI, Ru5PE, TIM, and ALD. The purity of the recombinant proteins was examined by sodium dodecyl sulfate polyacrylamide gel electrophoresis (SDS-PAGE, (FIG. 16).

TABLE 2

Information of recombinant thermophilic enzymes

| # | Enzyme | EC | ORF | Purification | Sp. Act.* (U mg$^{-1}$) | Load (U/EFC) |
|---|---|---|---|---|---|---|
| 1 | α-Glucan phosphorylase (αGP) | 2.4.1.1 | Cthe0357 | His/NTA | 0.2 | 5 |
| 2 | Phosphoglucomutase (PGM) | 5.4.2.2 | Cthe1265 | CBM/intein | 151 | 5 |
| 3 | Glucose-6-phosphate Dehydrogenase (G6PDH) | 1.1.1.49 | GenBank accession# JQ040549 | His/NTA | 4.0 | 5 |
| 4 | 6-phosphogluconate Dehydrogenase (6PGDH) | 1.1.4.44 | Moth1283 | His/NTA | 2.8 | 5 |
| 5 | Ribose-5-phosphate Isomerase (RPI) | 5.3.1.6 | Tm1080 | Heat precipitation | 60 | 1 |
| 6 | Ribulose-5-phosphate 3-Epimerase (Ru5PE) | 5.1.3.1 | Tm1718 | Hea tprecipitation | 0.8 | 1 |
| 7 | Transketolase (TK) | 2.2.1.1 | Ttc1896 | His/NTA | 1.3 | 1 |
| 8 | Transaldolase (TAL) | 2.2.1.2 | Tm0295 | His/NTA | 4.1 | 1 |
| 9 | Triosephosphate Isomerase (TIM) | 5.3.1.1 | Ttc0581 | Heat precipitation | 102 | 1 |
| 10 | Fructose 1,6-bisphosphate aldolase (ALD) | 4.1.2.13 | Ttc1414 | Heat precipitation | 2.9 | 1 |
| 11 | Fructose 1,6-bisphosphatase (FBP) | 3.1.3.11 | Tm1415 | CBM/intein | 3.0 | 1 |
| 12 | Phosphoglucose Isomerase (PGI) | 5.3.1.9 | Cthe0217 | CBM/intein | 201 | 1 |
| 13 | Diaphorase (DI) | 1.6.99.3 | GenBank accession# JQ040550 | His/NTA | 896 | 4 |

Measurement of Enzyme Activity

*Clostridium thermocellum* alpha-glucan phosphorylase (αGP) activity was assayed in 100 mM HEPES buffer (pH 7.5) containing 1 mM MgCl$_2$, 5 mM DTT, 30 mM maltodextrin, and 10 mM sodium phosphate at 23° C. for 5 min. The reaction was stopped by adding HClO$_4$ followed by neutralization with KOH. Glucose 1-phosphate (G1P) was measured using a glucose hexokinase/G6PDH assay kit (Pointe Scientific, Canton, Mich., USA) supplemented with phosphoglucomutase (PGM).

*C. thermocellum* phophoglucomutase (PGM) activity was measured in 100 mM HEPES buffer (pH 7.5) containing 5 mM MgCl$_2$, 0.5 mM MnCl$_2$, and 5 mM G1P at 23° C. for 5 min. The glucose 6-phosphate (G6P) product was determined using a hexokinase/G6PDH assay kit.

*Geobacillus stearothermophilus* glucose-6-phosphate dehydrogenase (G6PDH) activity was assayed in 100 mM HEPES buffer (pH 7.5) containing 100 mM NaCl, 2 mM G6P, 2 mM NAD$^+$, 5 mM MgCl2, and 0.5 mM MnCl$_2$ at 23° C. An increase in the absorbance due to the formation of NADH was measured at 340 nm.

*Morella thermoacetica* 6-phosphogluconate dehydrogenase (6PGDH) activity was measured in a 100 mM HEPES buffer (pH 7.5) containing 2 mM 6-phosphogluconate, 2 mM NAD$^+$, 5 mM MgCl$_2$, and 0.5 mM MnCl$_2$ at 23° C. for 5 min.

*Thermotoga maritima* ribose-5-phosphate isomerase (RPI) activity was assayed using a modified Dische's cysteine-carbazole method.

*T. maritima* ribulose-5-phosphate epimerase (Ru5PE) activity was determined on a substrate of D-ribulose 5-phosphate as described previously.

*Thermus thermophilus* transketolase (TK) activity was measured in a 50 mM Tris/HCl (pH 7.5) buffer containing 0.8 mM D-xylulose 5-phosphate, 0.8 mM D-ribose 5-phosphate, 5 mM MgCl$_2$, 0.5 mM thiamine pyrophosphate, 0.15 mM NADH, 60 U mL$^{-1}$ of TIM and, 20 U mL$^{-1}$ of glycerol 3-phosphate dehydrogenase. The reaction was started with the addition of TK at 23° C. The D-glyceraldehyde 3-phosphate product was quantified through the consumption of NADH measured at 340 nm for 5 min.

*T. maritima* transaldolase (TAL) activity was assayed as reported previously in Huang et al., A thermostable recombinant transaldolase with high activity over a broad pH range. *Appl. Microbiol. Biotechnol.* 93: 2403-2410 (2012).

*T. thermophilus* triosephosphate isomerase (TIM) activity was determined in 50 mM Tris/HCl (pH 7.5) containing 5 mM MgCl$_2$, 0.5 mM MnCl$_2$, 0.5 mg mL$^{-1}$ BSA, 20 U mL$^{-1}$ of glycerol 3-phosphate dehydrogenase, and 0.25 mM NADH.

*T. thermophilus* fructose 1,6-bisphosphate aldolase (ALD) was assayed in a 50 mM Tris/HCl Buffer (pH 7.5) at 23° C. with 1.9 mM fructose 1,6-biphosphate as a substrate. The glyceraldehyde 3-phosphate product was quantified with 0.15 mM NADH, 60 U mL$^{-1}$ of TIM, and 20 U mL$^{-1}$ of glycerol 3-phosphate dehydrogenase at 340 nm.

*T. maritima* fructose 1,6-bisphosphatase (FSP) activity was determined based on the release of phosphate.

*C. thermocellum* phosphoglucose isomerase (PGI) activity was assayed at 23° C. In 100 mM HEPES (pH 7.5) containing 10 mM MgCl$_2$, 0.5 mM MnCl$_2$, and 5 mM fructose 6-phosphate. After 3 minutes, the reaction was stopped with the addition of HClO$_4$ and neutralized with KOH. The G6P product was analyzed at 37° C. with a hexokinase/G6PDH assay kit.

*G. stearothermophilus* diaphorase (DI) activity was assayed in 10 mM, phosphate buffered saline solution containing 0.16 mM NADH and 0.1 mM dichlorophenolindophenol (DCPIP) at 23° C. A decrease in the absorbance at 600 nm due to the consumption of DCPIP was measured using a spectrometer.

Activities of the G6PDH and DI immobilized on the carbon paper electrodes were assayed under the same conditions as for the free enzymes. The reactions were started by immersing the electrodes in the substrate solution at 23° C. After removing the electrodes from the reactions, the changes in the absorbance in the reaction solutions were measured as described for the G6PDH and DI assays.

Anode Preparation

The air-breathing enzymatic fuel cell apparatus is shown in FIG. 17. The reaction volume of the anode compartment was 15 mL. The electrolyte was deoxygenated by flushing with ultra-pure nitrogen for a half hour. The electrolyte was mixed using a magnetic stir bar at 600 rpm. The Nafion 212 membrane was used to separate the anode and the cathode whose surface was coated with 0.5 mg cm$^{-2}$ Pt. The anode compartment was a glass electrolyte container equipped with a rubber stopper for sealing the anode compartment.

Two enzyme immobilization methods were used to prepare the anodes equipped with the immobilized enzymes.

Method 1 was based on the entrapment of enzymes into a quaternary ammonium bromide salt modified Nafion. The casting solution mixture was prepared by adding 39 mg of tetrabutylammonium bromide (TBAB) with 1 mL of 5% Nafion 1100 EW suspension (ion Power, Inc., New Castle, Del., USA). After drying overnight, the mixture was washed with 3.5 mL of 18 MΩ deionized water and re-suspended in 1 mL of isopropanol. The enzyme solution mixture consisted of 1 unit of G6PDH, 40 units of DI, 1 mM NAD$^+$, and 0.29 M VK$_3$. The carbon paper anode was covered by a mixture of 100 μL of the casting solution and 100 μL of the enzyme solution and dried at room temperature.

Method 2 was based on covalent bond linkage between the enzymes and the carbon nanotubes (CNTs). A 10 μL volume of a 2% wt/v PLL solution was used to coat the carbon paper, followed by addition of 20 μL of 25 mM EDC. Meanwhile, 2.5% wt/v COOH-functionalized CNTs were suspended in a 50% ethanol solution and sonicated for 30 min. The carbon paper was then treated with 40 μL of the CNT-containing solution and dried at room temperature. Another 10 μL of 400 mM EDC and 10 μL of 100 mM NHS were then added, followed by the addition of 1 unit of G6PDH, 40 units of DI, 1 mM NAD$^+$, and 10 μL of 0.29 M VK$_3$ acetone solution.

Both types of anodes with immobilized enzymes were stored in 100 mM HEPES buffer containing 2 mM NAD$^+$ and 100 mM NaNO$_3$ at 4° C. before use.

For preparation of the non-immobilized enzyme anodes, 1 or 3 mg of CNTs were added to the surface of a 1 cm$^2$ carbon paper (AvCarb MGL200) from Fuel Cell Earth using poly-L-lysine (PLL, MW ~70-150 kDa) as described previously in Zhu et al., Deep oxidation of glucose in enzymatic fuel cells through a synthetic enzymatic pathway containing a cascade of two thermostable dehydrogenases, *Biosens. Bioelectron.* 36: 110-115 (2012). A 10 or 30 μL solution of 0.29 M vitamin K$_3$ dissolved in acetone was deposited on the dry CNT-containing anode under a hood. After two hours of acetone evaporation, the water-insoluble vitamin K$_3$ was deposited onto the anode through physical adsorption.

Electrochemical Characterization of EFCs

All electrochemical tests were performed using a 1000B Multi-Potentiostat (CH Instruments Inc., Austin, Tex., USA) interfaced to a PC. Experimental data pertaining to current and power outputs were normalized to a 1 cm$^2$ of anode area because the reaction occurring at the anode was the rate-limiting step and the oxidation of protons mediated by Pt in MEAs was not rate-limiting. The measurements of open circuit potential and linear sweep voltammetry were performed at a scan rate of 1 mV s$^{-1}$.

For the comparison of the power generation from the immobilized and non-immobilized enzyme EFCs (FIG. 13); the electrolytes contained 10 mM G6P, 100 mM HEPES buffer (pH 7.5), 2 mM NAD$^+$, 10 mM MgCl$_2$, and 0.5 mM MnCl$_2$. One unit of G6PDH and 40 units of DI were either immobilized on the electrodes or dissolved in the electrolyte.

When maltodextrin was used as a substrate (FIG. 9), the electrolytes contained 100 mM HEPES buffer (pH 7.5), non-immobilized enzymes, 0.1 mM maltodextrin, 4 mM NAD$^+$, 4 mM sodium phosphate, 10 mM MgCl$_2$, 0.5 mM MnCl$_2$, 5 mM DTT, and 0.5 mM thiamine pyrophosphate at room temperature.

The one-dehydrogenase EFC contained the first three enzymes (i.e., alpha-glucan phosphorylase, phosphoglucomutase, and glucose 6-phosphate dehydrogenase) plus DI. The two-dehydrogenase EFC contained the first four enzymes (i.e., alpha-glucan phosphorylase, phosphoglucomutase, glucose 6-phosphate dehydrogenase, and 6-phosphogluconate dehydrogenase) plus DI. The EFC used for the complete oxidation of maltodextrin contained all thirteen enzymes. The enzyme loading conditions are shown in Table 2.

The complete oxidation of maltodextrin (0.1 mM) was measured (FIG. 9, Panel B and FIG. 19) in a 100 mM HEPES buffer (pH 7.5) containing 10 mM MgCl$_2$, 0.5 mM MnCl$_2$, 4 mM NAD$^+$, 4 mM sodium phosphate, 5 mM DTT, and 0.5 mM thiamine pyrophosphate. To prevent microbial contamination, 50 mg L$^{-1}$ kanamycin, 40 mg L$^{-1}$ tetracycline, 40 mg L$^{-1}$ cycloheximide, and 0.5 g L$^{-1}$ sodium azide were added. To improve the stability of the enzyme mixture, 1 g L$^{-1}$ bovine serum albumin and 0.1% Triton X-100 were added. The enzyme loading conditions are shown in Table 2. Amperometry was conducted at 0 V to achieve the maximal current density. The EFC with 0.2 mM G6P was run for 2 days until nearly zero current was obtained, before a solution of 0.1 mM maltodextrin (i.e., ~1.9 mM glucose) was added. The complete oxidation of maltodextrin took approximately one week at room temperature and the remaining maltodextrin was quantified using a SA-20 starch assay kit (Sigma-Aldrich, St. Louis, Mo., USA). The Faraday efficiency was calculated according to $$F_{MD-current} = C_{total}/(\Delta c_{glucose\ unit} \times V \times 24 \times F)$$

where $F_{MD-current}$ is the Faraday efficiency, $C_{total}$ is the total charge generated (C), $\Delta c_{glucose\ unit} = c_{initial} - c_{remain}$ (M), V is reaction volume (L), 24 represents the 24 electrons generated per glucose unit consumed, and F is the Faraday constant. The control experiment without maltodextrin was also performed (FIG. 19).

To further increase the power density of the EFCs, several factors were optimized (FIG. 10, Panels A-E) in 100 mM HEPES (pH 7.5) buffer containing 20 mM G6P, 10 mM MgCl$_2$, 0.5 mM MnCl$_2$, 8 mM NAD$^+$, 4 mM sodium phosphate, 0.5 mM thiamine pyrophosphate, and G6PDH. All experiments were conducted in the following order: CNT loading (1, 3 or 5 mg per electrode), number of electrode sheets piled up together (1, 3 or 6), enzyme loading (1, 10, or 30 units) and reaction temperature (23, 50, or 65° C.).

The effect of CNTs loading on one 1 cm$^2$ carbon paper as the anode was measured under the following conditions: 20 mM G6P, 1 U of G6PDH, 80 U of DI, 100 mM HEPES (pH 7.5), 10 mM MgCl$_2$, 0.5 mM MnCl$_2$, 8 mM NAD$^+$, 4 mM sodium phosphate, 0.5 mM thiamine pyrophosphate, 1 electrode, 1 mg, 3 mg, or 5 mg CNTs per electrode and 23° C. The effect of the number of the stacked anodes made by 1 cm$^2$ carbon paper deposited with 3 mg CNTs was measured under the following conditions: 20 mM G6P, 1 U of G6PDH, 80 U of DI, 100 mM HEPES (pH 7.5), 10 mM MgCl$_2$, 0.5 mM MnCl$_2$, 8 mM 4 mM sodium phosphate, 0.5 mM thiamine pyrophosphate, 1, 3, or 6 electrodes and 23° C. The effect of G6PDH loading from 1 to 30 U in the EFC containing a stack of 6 electrodes, each of which contained 3 mg CNTs was measured under the following conditions: 20 mM G6P, 1, 10, or 30 U of G6PDH, 80 U of DI, 100 mM HEPES (pH 7.5), 10 mM MgCl$_2$, 0.5 mM MnCl$_2$, 8 mM NAD$^+$, 4 mM sodium phosphate, 0.5 mM thiamine pyrophosphate and 23° C. The effect of reaction temperature at 23, 50, or 65° C. In the EFC containing a stack of 6 electrodes, each of which contained 3 mg CNTs was measured under the following conditions: 20 mM G6P, 30 U of G6PDH, 80 U of DI, 100 mM HEPES (pH 7.5), 10 mM MgCl$_2$, 0.5 mM MnCl$_2$, 8 mM NAD$^+$, 4 mM sodium phosphate, and 0.5 mM thiamine pyrophosphate. In FIG. 10, Panels B-D, six 1 cm$^2$ carbon papers deposited with 3 mg CNTs were stacked together as the anode. The inset figures in FIG. 10, Panels A and B represent zoom-in profiles.

The effect of scanning rate was also measured in the buffer (FIG. 10E).

To demonstrate the capability of the "cuvette-like" EFC that can power up a digital clock or a LED light (FIG. 20), two windows were opened at the sides of the cuvette. Each window was pasted with a MEA whose Nafion side faced inside the cuvette. A modified anode without the enzyme was dipped inside the cuvette. The 3 mL of reaction solution contained 40 U of DI, 4 U of G6PDH and 6PGDH, 100 mM G6P, 100 mM HEPES (pH 7.5), 4 mM NAD$^4$, 10 mM MgCl$_2$, and 0.5 mM MnCl$_2$ at room temperature.

The sugar-refilling experiment for the non-immobilized-enzyme EFC (FIG. 21) was conducted at an initial maltodextrin concentration of 0.01 mM. When the sugar in EFC was consumed completely (i.e., the current outputs were closer to zero), the concentrated maltodextrin concentration was added to achieve the final concentration of 0.01 mM. The maltodextrin solutions were refilled twice.

The preliminary diagnostic experiment for the aged EFC (FIG. 22, Panel A) was run after ca. 200 hours of running when the current density went back to nearly zero. The fresh substrate (0.1 mM maltodextrin) was added plus the 13 enzymes with the same loading. After several hours, a newly-prepared carbon electrode deposited with VK$_3$ was used for testing.

To compare the stability of the immobilized and non-immobilized enzyme systems (FIG. 22, Panel B), open circuit potential and linear sweep voltammetry were performed with the electrolyte containing 2 mM G6P, 100 mM HEPES buffer (pH 7.5), 2 mM NAD$^+$, 10 mM MgCl$_2$, 0.5 mM MnCl$_2$ at room temperature. One unit of G6PDH and 40 units of DI immobilized on the electrode or free in the stocking solution were added. After one round of test, the immobilized enzyme electrode was taken out and stored in the reaction buffer without G6P at 4° C. For the non-immobilized enzymes, the reaction solution containing the enzymes was stored at 4° C. when all G6P was consumed. In another set of the non-immobilized enzyme reaction, 1 g/L of bovine serum albumin and 0.1% v/v Triton X-100 were supplemented to increase the stability of the free enzymes.

The best EFC condition was 100 mM HEPES buffer (pH 7.5), 10 mM MgCl$_2$, 0.5 mM MnCl$_2$, 4 mM NAD$^+$, 0.5 mM thiamine pyrophosphate, 5 mM DTT, 15% (wt/v) maltodextrin, 40 mM sodium phosphate as substrates, and enzyme loading conditions of 30 units of #1-#4 enzymes, 10 units of #5-#12 enzymes, 80 units of DI, 50 mg L$^{-1}$ kanamycin, 40 mg L$^{-1}$ tetracycline, 40 mg L$^{-1}$ cycloheximide, and 0.5 g L$^{-1}$ sodium azide. For long-term non-disruptive operation, an external resistance of 150Ω was applied. The power density was measured for 60 hours at 23° C. (FIG. 10, Panel F).

Results

Comparison of Non-Immobilized and Immobilized Enzymes

To compare the EFCs equipped with non-immobilized enzymes to the two EFCs equipped with immobilized enzymes, equivalent amounts of glucose 6-phosphate dehydrogenase (G6PDH) and diaphorase (DI) were used to test the polarization and the power outputs of the EFCs for glucose-6-phosphate fuel (FIG. 13, Panel A). The experiment was conducted under the following conditions: 1U G6PDH, 40U DI, 10 mM G6P in 100 mM HEPES (pH 7.5) buffer containing 2 mM NAD$^+$, 10 mM Mg$^2$, and 0.5 mM Mn$^{2+}$ at room temperature.

The mass transport region for the non-immobilized EFCs occurred at higher current densities compared to the covalent binding-based EFCs (FIG. 13, Panel B), suggesting the influence of enhanced mass transport for the non-immobilized enzymes.

The EFC based on non-immobilized G6PDH exhibited the highest power density of 0.13 mW cm$^{-2}$, three times higher than that of the covalent binding method. The EFC based on the TBAB-modified Nafion polymer entrapment method had the lowest maximum power density of 0.0013 mW cm$^{-2}$, which was only 4% of the density for the covalent binding method. The G6PDH immobilized by Nafion polymer entrapment and the covalent binding retained 0.2% and 6% of its non-immobilized activity, respectively. The DI immobilized by Nafion polymer entrapment and the covalent binding retained 0.4% and 7.5% of its non-immobilized activity, respectively (Table 3). These data for enzyme activity clearly suggest that a dramatic activity loss occurs due to enzyme immobilization. The power density data validate the feasibility of using non-immobilized enzyme(s) to achieve high-power output in EFCs.

TABLE 3

Comparison of remaining activities of the immobilized enzymes with those of non-immobilized enzymes.

|  | Polymer entrapped | Covalent linking | Non-immobilized |
| --- | --- | --- | --- |
| G6PDH activity (U mg$^{-1}$) | 0.0080 ± 0.0004 | 0.23 ± 0.03 | 4.1 ± 0.3 |
| DI activity (U mg$^{-1}$) | 3.3 ± 0.2 | 67 ± 4 | 896 ± 25 |

Complete Oxidation of Maltodextrin

To release the maximum electron potential from each glucose unit (i.e., 24 per glucose), we designed a non-natural enzymatic pathway containing 13 enzymes (FIG. 14). This synthetic pathway is comprised of four functional modules: glucose-6-phosphate (G6P) generation from maltodextrin mediated by alpha-glucan phosphorylase and phosphoglucomutase (Equation 1); 2 NADH generated from G6P mediated by two-NAD-dependent G6PDH and 6-phosphogluconate dehydrogenase (6PGDH) (Equation 2); NADH electro-oxidation through non-immobilized DI to immobilized VK$_3$ that generates 2 electrons per NADH (Equation 3); and 5/6 moles of G6P regeneration from one mole of ribulose 5-phosphate via a hybrid pathway comprised of enzymes in the pentose phosphate, glycolysis, and gluconeogenesis pathways (Equation 4). The overall anode reaction for the combination of Equations 1-4 approximately results in Equation 5. Clearly, each glucose unit from maltodextrin can generate 24 electrons on the anode via this de novo pathway (Equation 5).

$$(C_6H_{10}O_5)_n + P_i \rightarrow G6P + (C_6H_{10}O_5)_{n-1} \quad [1]$$

$$G6P + H_2O + 2NAD^+ \rightarrow \text{ribulose 5-phosphate} + CO_2 + 2NADH + 2H^- \quad [2]$$

$$NADH + H^+ \rightarrow 2H^+ + 2e^- \quad [3]$$

$$\text{6 ribulose 5-phosphate} + H_2O \rightarrow \text{5 G6P} + \text{phosphate} \quad [4]$$

$$C_6H_{10}O_5 + 7H_2O \rightarrow 24e^- + 6CO_2 + 24H^+ \text{ (anode compartment)} \quad [5]$$

The pathway utilizes two NAD-dependent G6PDH and 6PGDH to generate NADH differently from natural NADP-dependent enzymes in the pentose phosphate pathway. The above pathway does not require either ATP or CoA, which are very costly and unstable in EFCs. Moreover, phosphate ions can be recycled to maintain constant pH and ion concentrations. This cyclic pathway design is different from the linear pathways typically used in EFCs.

The power densities from maltodextrin fuel (i.e., 2 mM glucose units) were compared for three EFCs that used one dehydrogenase (i.e., G6PDH), two dehydrogenases (i.e., G6PDH and 6PGDH), or the entire pathway (FIG. 9A). The open circuit potentials were similar for the three EFCs (~0.7 V). When only G6PDH was used, the EFC exhibited a maximum power density of 0.011 mW cm$^{-2}$. When a second dehydrogenase (6PGDH) was added, the maximum power density increased by a factor of two, to 0.024 mW cm$^{-2}$. When eight additional enzymes were added to reconstitute the entire pathway (FIG. 14), the maximum power density increased slightly to 0.026 mW cm$^{-2}$. The corresponding maximum current density was 35% higher than the current density of the system based on two dehydrogenases (FIG. 9A).

To quantitatively validate the complete oxidation of the glucose units of maltodextrin, we measured the Faraday efficiency from NADH to electrons through the diaphorase and vitamin K$_3$ in the air-breathing EFC (FIG. 18). The initial composition of deoxygenated electrolyte contained 0.4 U of DI, 100 mM HEPES (pH 7.5), 10 mM MgCl$_2$, and 0.5 mM MnCl$_2$. Amperometric measurement was performed to monitor current generation with time. First, a small amount (0.2 mM) of NADH was added to start the reaction. When NADH was all consumed, the reaction system achieved an equilibrium state. Second, when another 2 mM NADH was added, current started to increase with time. Samples were withdrawn from time to time by using a syringe and the residual NADH concentration was measured by a UV spectrophotometer. Faraday efficiency of electro-enzymatic oxidation of NADH was calculated as below:

$$F_{NADH\text{-}current} = \Delta C / (\Delta c \times V \times 2 \times F)$$

where $F_{NADH\text{-}current}$ is Faraday efficiency of electro-enzymatic oxidation of NADH, $\Delta C$ is the slope of total charge increase (C), $\Delta c$ is the slope of NADH concentration decrease (M), V is reaction volume (L), 2 represents 2 electrons generated per NADH consumed, F is Faraday constant.

Under oxygen-free conditions for the anode compartment, the Faraday efficiency of the EFC was 97.6±3.0% (FIG. 18), suggesting that the electro-enzymatic oxidation of NADH is highly efficient. Moreover, the removal of oxygen from the anode compartment was essential for obtaining a high Faraday efficiency and preventing the non-selective oxidation of NADH.

In a 15-mL EFC containing 13 enzymes and a low concentration of maltodextrin at room temperature (FIG. 9B), the current density increased to a peak value of 0.12 mA cm$^{-2}$ at hour 24 and then decreased slowly due to substrate consumption. After more than 150 h, the current output decreased to nearly zero. The cumulative electric charge generated was 48.9 C relative to the theoretical electric charge generated based on the consumption of the glucose units (i.e., 53.0 C, one mole of glucose unit can generate 24×96,485 C in principle). This result suggests a cumulative Faraday efficiency of 92.3% with one mole of glucose generating 22.2 moles of electrons.

It was noted that the negative control (i.e., the same EFC without the substrate) did not generate significant current outputs (FIG. 19). The Faraday efficiency was higher than that of the microbial fuel cell based on glucose (83%), because cell-free biosystems do not waste organic fuels on cell growth and by-product formation, as demonstrated previously. Bujara et al., "Optimization of a blueprint for in vitro glycolysis by metabolic real-time analysis," Nat. Chem. Biol. 7: 271-277 (2011); Martin del Campo, J. S. et al., "High-Yield Production of Dihydrogen from Xylose by Using a Synthetic Enzyme Cascade in a Cell-Free System," Angew. Chem. Int. Ed. 52: 4587-4590 (2013). Our system provides the first quantitative evidence for nearly 24 electrons produced per glucose unit in an EFC. Moreover, our data suggest that we can convert all of the chemical energy from the sugar into electrical energy and increase the energy density of the EFC by one order of magnitude.

High-Energy-Density High-Power EFCs

Power density is another important consideration in EFCs. To increase the power density, we optimized a number of factors, including the EFC configuration, the enzyme loading, and the experimental conditions under which the non-immobilized G6PDH acts on the G6P.

The optimal CNT loading was 3 mg per cm$^2$ of carbon paper (FIG. 10 Panel A). The six electrodes stacked together as a 3-D anode increased the maximum power density by 50% and the maximum current density by 4-fold (FIG. 10, Panels A and B). Increasing the enzyme loading from 1 to 10 U per cell drastically increased the maximum power density and maximum current density to 0.35 mW cm$^{-2}$ and 4.1 mA cm$^{-2}$, respectively, at room temperature (23° C.) (FIG. 10, Panel C). Elevating the temperature to 50° C. doubled the maximum power density to 0.8 mW cm$^{-2}$ (FIG. 10, Panel D).

The EFC comprised of the 13 non-immobilized enzymes based on 15% (wt/v) maltodextrin generated the maximum power density of 0.4 mW cm$^{-2}$ at a scanning rate of 1 mV s$^{-1}$ at room temperature. The EFC generated a nearly constant power output of approximately 0.32 mW cm$^{-2}$ for 60 hours in a closed system (FIG. 10, Panel F). In addition, a stack of two cuvette-based EFCs can power a digital clock and a LCD light (FIG. 20), suggesting that these EFCs could be used to power a number of electronic devices in the near future.

The complete oxidation of the glucose units of the 15% maltodextrin solution means that the energy storage density of this sugar-powered EFC can be as high as 596 Ah kg$^{-1}$, which is more than one order of magnitude higher than the energy storage densities for lithium-ion batteries and primary batteries (FIG. 15 and Table 4).

energy density of the entire system including the fuel, a fuel tank, and a fuel cell system can be close to the theoretical

TABLE 4

Comparison of energy densities of batteries and EFCs

| Battery type | Energy density Unit | | | Voltage | |
| --- | --- | --- | --- | --- | --- |
| | $MJ\ kg^{-1}$ | $Ah\ kg^{-1}$ | $Wh\ kg^{-1}$ | V | Ref. |
| Primary Batteries | | | | | |
| Zinc-carbon battery | 0.15 | 28 | 40 | 1.50 | Wikipedia |
| AA alkaline battery | 0.58 | 107 | 160 | 1.50 | Wikipedia |
| Li—$MnO_2$ battery | 0.90 | 83 | 250 | 3.00 | Wikipedia |
| Rechargeable Batteries | | | | | |
| Lead acid battery | 0.14 | 19 | 40 | 2.11 | Wikipedia |
| NiMH battery | 0.36 | 80 | 100 | 1.25 | Wikipedia |
| Lithium ion battery | 0.54 | 42 | 150 | 3.60 | Wikipedia |
| Enzymatic fuel cells (biobatteries) | | | | | |
| 0.5M methanol solution | 0.48* | 80 | 40.2 | 0.50 | 10 |
| 7.2% glucose solution (2 e) | 0.093* | 21 | 10.7 | 0.50 | 7 |
| 7.2% glucose solution (24 e) | 1.12* | 257 | 129 | 0.50 | Estimated |
| 15% maltodextrin (24 e) | 2.55* | 596 | 298 | 0.50 | This study |
| Fuels used for EFCs | | | | | |
| 100% methanol (6 e) | 19.7* | 5030 | 2515 | 0.50 | Estimated |
| 100% glucose (24 e) | 15.5* | 3574 | 1787 | 0.50 | Estimated |
| 100% maltodextrin (24 e) | 17.0* | 3970 | 1985 | 0.50 | Estimated |

*Combustion energy or higher heating value.

Although the voltages of the EFCs (e.g., 0.5 V) are much lower than the voltages of lithium-ion batteries (3.6 V), the energy density of the 15% sugar-powered EFC can reach up to 298 Wh kg−1, several times that of common rechargeable batteries (e.g., Pd-acid, NiMH, and lithium-ion batteries) and higher than that of common primary batteries (e.g., zinc-carbon, alkaline, and Li—$MnO_2$ batteries) (FIG. 15). The cuvette-based EFC (FIG. 20) has an energy storage density of ~238 Wh kg$^{-1}$ for the entire system, because the weight of the combined electrode materials, the plastic cuvette, and the membrane electrode assembly accounts for approximately 20% of the entire device weight. Such biobatteries may be regarded as environmentally friendly disposable primary batteries because they have better energy densities and less environmental impact.

In addition to the one order of magnitude improvement in the energy density of the sugar biobatteries via this synthetic pathway, relative to the system with one redox enzyme (FIG. 15), the biobatteries equipped with non-immobilized enzyme cascades might be refilled by the addition of the sugar solution because the sole gaseous product ($CO_2$) can be easily released from the anode compartment and the non-immobilized enzymes are not washed out of the EFCs. The non-immobilized enzyme EFC was tested by adding the sugar solution twice (FIG. 21). However, the decreased performance of the EFCs suggested more research and development needed for extending the life-time of EFCs.

These sugar biobatteries represent a new type of rechargeable battery. One of the greatest advantages of fuel cells compared to closed primary and secondary batteries is that they are open systems that use high-energy density fuels (e.g., $H_2$, methanol, glucose, and maltodextrin) that can be fed into the fuel cell device continuously (e.g., proton exchange membrane fuel cells) or sporadically (for example, direct methanol fuel cells and sugar batteries). When the weight ratio of the fuel to the fuel cell system is large enough (i.e., 5-10) or if the fuel cell is refilled a number of times, the energy density of the fuel that is used. Clearly, the use of water-free chemicals as fuels is more attractive in terms of energy storage density (FIG. 15). However, a separate fuel tank and a complicated fuel feeding system is required in such a system.

Maltodextrin is a better EFC fuel than alcohols (e.g., methanol) or glucose. Maltodextrin is slowly-utilized via the synthetic pathway to generate a nearly constant power output (FIG. 10F) rather than a peak power over a short time. In addition, most enzymes cannot work well in high concentrations of alcohol or glucose due to inhibition or low water activity. For example, the highest methanol concentration that can be used in EFCs is approximately 0.5 M, resulting in a lower energy storage density of 40.2 Wh kg$^{-1}$ (FIG. 15). Similarly, high concentrations of glucose (e.g., 0.4 M) lead to high osmotic pressures (~9.85 atm) that can impair enzyme activity. Compared to the six-enzyme EFC that oxidizes glucose to $CO_2$, the inherently low, but promiscuous, activities of one enzyme that catalyzes several substrates once results in very low power densities. The use of more than 10 enzymes for implementing complex reactions for the production of biocommodities, fine chemicals, and pharmaceuticals seems not economically prohibitive.

One of the most important issues for sugar biobatteries is extending their lifetime. This involves improving the stability of enzymes, cofactors, and mediators. A preliminary diagnostic experiment was conducted to study the decreased performance of the non-immobilized EFCs (FIG. 22A). The addition of the new substrate and enzyme mixture to the EFC resulted in a quarter of the maximum power output, suggesting that enzyme deactivation is one of the causes of the decreased power output after more than one week of operation at room temperature. Instead of using immobilized enzymes like in most EFCs, we prolonged the lifetime of enzymes using non-immobilized thermoenzymes isolated from (hyper-)thermophilic microorganisms. Clearly, relatively non-stable thermoenzymes, such as PGI, αGP, and PGM, isolated from thermophiles can be replaced with enzymes from hyperthermophiles or engineered mutants enzymes generated by protein engineering (i.e., rational design, directed evolution or a combination of methods). In addition, the half lifetime of the non-immobilized enzymes increased from 5.0 days to 7.7 days through the addition of 1 g L$^{-1}$ bovine serum albumin and 0.1% Triton X-100 (FIG. 22B), suggesting that the formulation of enzyme mixture can also be adjusted to prolong the lifetime of non-immobilized enzyme mixtures. Furthermore, replacement of old anodes with new anodes doubles the power output to nearly half of the maximum power output (FIG. 22A), indicating that leaching of adsorbed VK$_3$ from the anode results in lower power outputs. Therefore, it will be important to adopt a better method to immobilize VK$_3$-like mediators on the surface of anodes.

Thus, a synthetic ATP- and CoA-free catabolic pathway comprised of 13 enzymes in an air-breathing EFC is constructed to completely oxidize the glucose units of maltodextrin, yielding nearly 24 electrons per glucose: We found that the EFC based on non-immobilized enzymes exhibited a maximum power output far higher than those of the immobilized enzymes. These sugar-powered biobatteries feature high energy storage densities and high safety. Thus, these batteries represent next-generation micro-power sources that could be especially useful for portable electronics.

Engineered GsG6PDH

Figure 7:
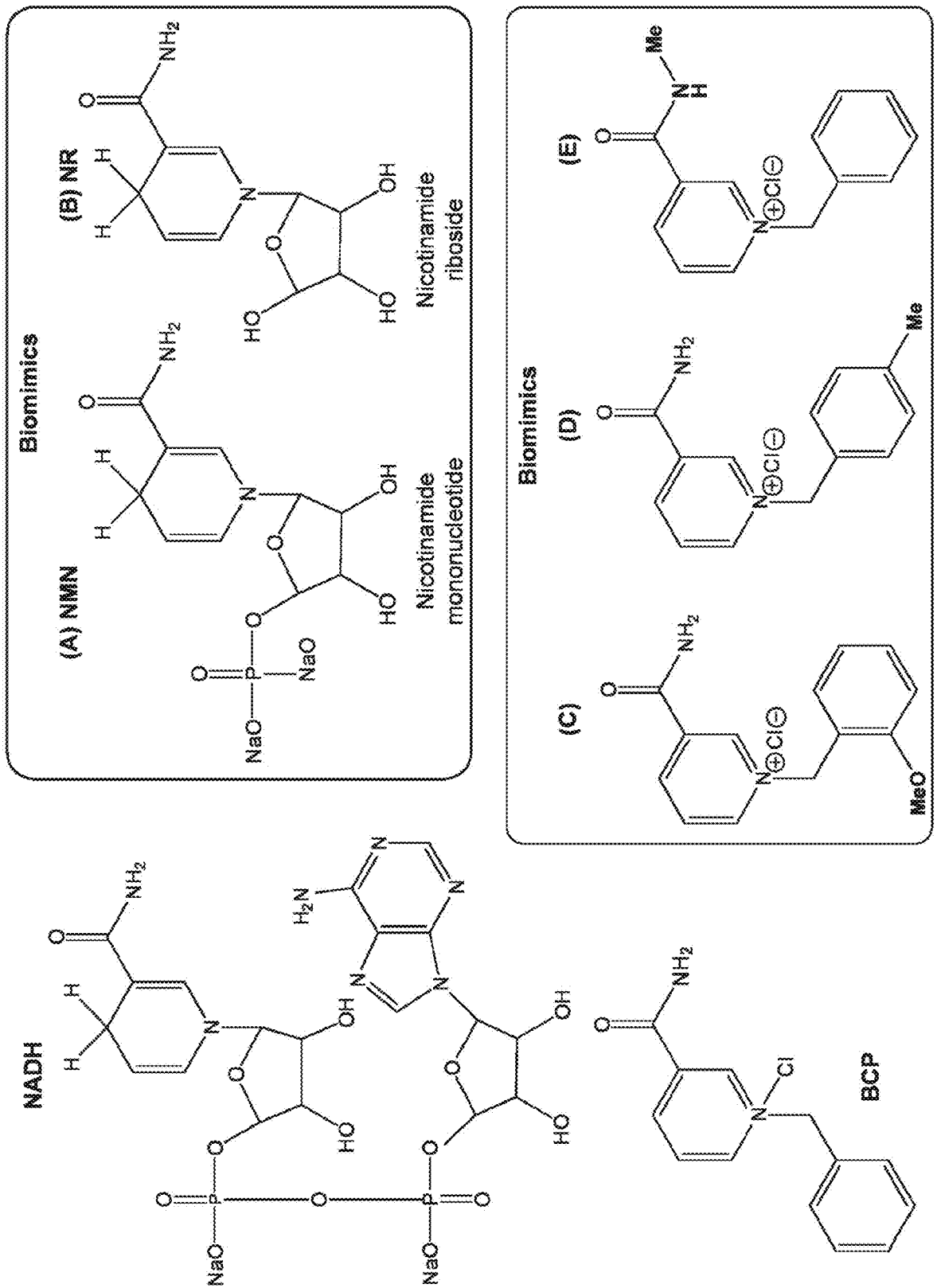
FIG. 7 is a schematic diagram showing structures of NADH and its biomimics (NMN and NR) and BCP and its analogue alternatives (biomimics).
Figure 8:
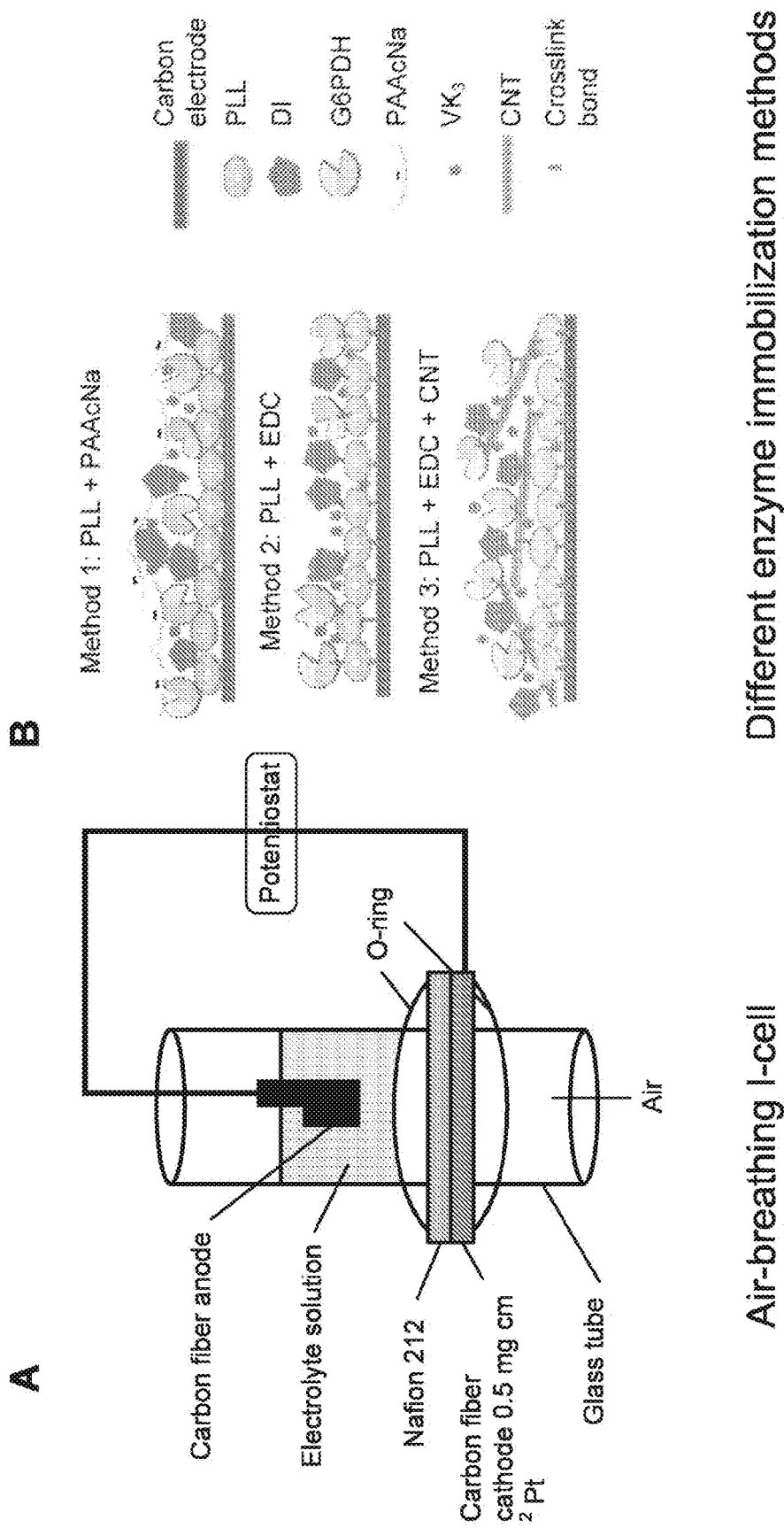
FIG. 8 is a schematic diagram of an exemplary enzymatic fuel cell (Panel A, a tested fuel cell; Panel B, enzymes and mediators on anode).

Wild-type *Geobacillus stearothermophilus* G6PDH (GsG6PDH) prefers NAD to NADP but does not work on biomimics (FIG. 7, Compounds A-E). After protein engineering by rational design and/or directed evolution, an engineered GsG6PDH (T13G/R46G) was produced that worked on NMN (Compound A) (FIG. 11).

The above disclosure provides particular embodiments of the present invention. It is intended that the above disclosure be considered as exemplary in nature and that variations that do not depart from the essence of the invention are intended to be within the scope of the invention. The particular embodiments disclosed above are illustrative only, as the present invention may be modified and practiced in different but equivalent manners apparent to those skilled in the art having the benefit of the teachings herein.

It is evident that the particular illustrative embodiments disclosed above may be altered or modified and all such variations are considered within the scope and spirit of the present invention. It will be apparent to those skilled in the art that various modifications and variations can be made to the above disclosure in the practice of the present invention without departing from the scope or spirit of the invention. One skilled in the art will recognize that these features may be used singularly or in any combination based on the requirements and specifications of a given application or design.

REFERENCES

Addo, P. K., Arechederra, R. L. and Minteer, S. D. 2010. Evaluating enzyme cascades for methanol/air biofuel cells based on NAD$^+$-dependent enzymes. Electroanalysis 22, 807-812.

Akers, N. L., C. M. Moore and S. D. Minteer. 2005. Development of alcohol/O2 biofuel cells using salt-extracted tetrabutylammonium bromide/Nafion membranes to immobilize dehydrogenase enzymes. Electrochim. Acta 50(12):2521-2525.

Ardao, I. and Zeng, A.-P. 2013. In silico evaluation of a complex multi-enzymatic system using one-pot and modular approaches: Application to the high-yield production of hydrogen from a synthetic metabolic pathway. Chem. Eng. Sci. 87:183-193.

Arechederra, R. and S. D. Minteer. 2008. Organelle-based biofuel cells: Immobilized mitochondria on carbon paper electrodes. Electrochimica Acta 53(23):6698-6703.

Arechederra, R. L. and Minteer, S. D. 2009. Complete oxidation of glycerol in an enzymatic biofuel cell. Fuel Cells 9:63-69.

Armand, M. and J. M. Tarascon. 2008. Building better batteries. Nature 451(7179):652-657.

Barbir, F. *PEM Fuel Cells: Theory and Practice*. (Academic Press, 2005).

Bond, D. R. and Lovley, D. R. 2003. Electricity Production by *Geobacter sulfurreducens* Attached to Electrodes. Appl. Environ. Microbiol, 69: 1548-1555.

Bujara, M., Schümperli, M., Pellaux, R., Heinemann, M. and Panke, S. 2011. Optimization of a blueprint for in vitro glycolysis by metabolic real-time analysis. Nat. Chem. Biol. 7:271-277.

Calabrese Barton, S., Gallaway, J. and Atanassov, P. 2004. Enzymatic biofuel bells for implantable and microscale devices. Chem. Rev. 104:4867-4886.

Campbell, E., Meredith, M., Minteer, S. D. and Banta, S. 2012. Enzymatic biofuel cells utilizing a biomimetic cofactor. Chem. Commun. 48:1898-1900.

Caruana, D. J. and Howorka, S. 2010. Biosensors and biofuel cells with engineered proteins. Mol. BioSyst. 6:1548-1556.

Chakraborty, S., Sakka, M., Kimura, T. and Sakka, K. 2008. Two proteins with diaphorase activity from *Clostridium thermocellum* and *Moorella thermoacetica*. Biosci. Biotechnol. Biochem. 72:877-879.

Chaudhuri, S. K. and Lovley, D. R. 2003. Electricity generation by direct oxidation of glucose in mediatorless microbial fuel cells. Nat. Biotechnol. 21:1229-1232.

Chen, Z. et al. 2011. Three-dimensional flexible and conductive interconnected graphene networks grown by chemical vapour deposition. Nat. Mater. 10:424-428.

Chen, S. et al. 2012. Layered corrugated electrode macrostructures boost microbial bioelectrocatalysis. Energy Environ. Sci. 5:9769-9772.

Chen, Z. et al. 2013. New class of nonaqueous electrolytes for long-life and safe lithium-ion batteries. Nat. Commun. 4:1513.

Cooney, M. J., Svoboda, V., Lau, C., Martin, G. and Minteer, S. D. 2008. Enzyme catalysed biofuel cells. Energy Environ. Sci. 1:320-337.

Fish R H, Kerr J B, Lo H C; 2004. Agents for replacement of NAD+/NADH system in enzymatic reaction. U.S. Pat. No. 6,716,596 B2. USA.

Hong, J., Wang, Y., Ye X and Zhang, Y.-H. P. 2008. Simple protein purification through affinity adsorption on regenerated amorphous cellulose followed by intein self-cleavage. J. Chromatogr. A 1194:150-154.

Huang, S. Y., Zhang, Y.-H. P. and Zhong, J. J. 2012. A thermostable recombinant transaldolase with high activity over a broad pH range. Appl. Microbiol. Biotechnol. 93:2403-2410.

Johnston, W., Cooney, M. J., Liaw, B. Y., Sapra, R. and Adams, M. W. W. 2005. Design and characterization of redox enzyme electrodes: new perspectives on established techniques with application to an extremeophilic hydrogenase. Enzyme Microb. Technol. 36:540-549.

Kim, J., Jia, H. and Wang, P. 2006. Challenges in biocatalysis for enzyme-based biofuel cells. Biotechnol. Adv. 24:296-308.

Kim, Y. H., Campbell, E., Yu, J., Minteer, S. D. and Banta, S. 2013. Complete Oxidation of Methanol in Biobattery Devices Using a Hydrogel Created from Three Modified Dehydrogenases. Angew. Chem. Int. Ed. 52:1437-1440.

Krutsakom, B. et al. 2013. In vitro production of n-butanol from glucose. Metab. Eng. 20:84-91.

Martín del Campo, J. S. et al. 2013. High-Yield Production of Dihydrogen from Xylose by Using a Synthetic Enzyme Cascade in a Cell-Free System. Angew. Chem. Int. Ed. 52:587-4590.

Minteer, S. D., B. Y. Liaw and M. J. Cooney. 2007. Enzyme-based biofuel cells. Curr. Opin. Biotechnol. 18(3):228-234.

Moehlenbrock, M. and S. Minteer. 2008. Extended lifetime biofuel cells. Chem. Soc. Rev. 37:1188-1196.

Myung, S., Wang, Y. R. and Zhang, Y.-H. P. 2010. Fructose-1,6-bisphosphatase from a hyper-thermophilic bacterium *Thermotoga maritima*: Characterization, metabolite stability and its implications. Proc. Biochem. 45:1882-1887.

Myung, S., Zhang, X.-Z. and Zhang, Y.-H. P. 2011. Ultrastable phosphoglucose isomerase through immobilization of cellulose-binding module-tagged thermophilic enzyme on low-cost high-capacity cellulosic adsorbent. Biotechnol. Prog. 27:969-975.

Myung, S. and Zhang, Y.-H. P. 2013. Non-complexed four cascade enzyme mixture: simple purification and synergetic co-stabilization. PLos One 8:e61500.

Okuno H, Nagata K, Nakajima H. 1985. Purification and properties of glucose-6-phosphate dehydrogenase from *Bacillus stearothermophilus*. J. Appl. Biochem. 7:192-201.

Palmore, G. T. R, Bertschy, H., Bergens, S. H. and Whitesides, G. M. 1998. A methanol/dioxygen biofuel cell that uses $NAD^+$-dependent dehydrogenases as catalysts: application of an electro-enzymatic method to regenerate nicotinamide adenine dinucleotide at low overpotentials. J. Electroanal. Chem. 443:155-161.

Rollin, J. A., Tam, W. and Zhang, Y.-H. P. 2013. New biotechnology paradigm: cell-free biosystems for biomanufacturing. Green Chem. 15:1708-1719.

Sakai, H., T. Nakagawa, H. Mita, R. Matsumoto, T. Sugiyama, H. Kumita, Y. Tokita and T. Hatazawa. 2009. A high-power glucose/oxygen biofuel cell operating under quiescent conditions. ECS Trans. 16(38):9-15.

Sakai, H., T. Nakagawa, Y. Tokita, T. Hatazawa, T. Ikeda, S. Tsujimura and K. Kano. 2009. A high-power glucose/oxygen biofuel cell operating under quiescent conditions. Energy Environ. Sci. 2:133-138.

Shimizu, Y. et al. 2001. Cell-free translation reconstituted with purified components. Nat. Biotechnol. 19:751-755.

Sokic-Lazic, D. and S. D. Minteer. 2008. Citric acid cycle biomimic on a carbon electrode. Biosens. Bioelectron. 24(4):939-944.

Sun, F. F., Zhang, X. Z., Myung, S. and Zhang, Y.-H. P. 2012. Thermophilic *Thermotoga maritima* ribose-5-phosphate isomerase RpiB: Optimized heat treatment purification and basic characterization. Protein Expr. Purif. 82:302-307.

Togo, M., Takamura, A., Asai, T., Kaji, H. and Nishizawa, M. 2007. An enzyme-based microfluidic biofuel cell using vitamin K3-mediated glucose oxidation. Electrochimica Acta 52:4669-4674.

Tokita, Y., T. Nakagawa, H. Sakai, T. Sugiyama, R. Matsumoto and T. Hatazawa. 2008. Sony's Biofuel Cell. ECS Trans. 13(21):89-97.

Walcarius, A., Minteer, S., Wang, J., Lin, Y. and Merkoci, A. 2013. Nanomaterials for bio-functionalized electrodes: recent trends. J. Mat. Chem. B 1:4878-4908.

Wang, Y. and Zhang, Y.-H. P. 2010. A highly active phosphoglucomutase from *Clostridium thermocellum*: Cloning, purification, characterization, and enhanced thermostability. J. Appl. Microbiol. 108:39-46.

Wang, Y., Huang, W., Sathitsuksanoh, N., Zhu, Z. and Zhang, Y.-H. P. 2011. Biohydrogenation from biomass sugar mediated by in vitro synthetic enzymatic pathways. Chem. Biol. 18:72-380.

Willner, B., Katz, E. and Willner, I. 2006. Electrical contacting of redox proteins by nanotechnological means. Curr. Opin. Biotechnol. 17:589-596.

Wu, Z.-Y., Li, C., Liang, H.-W., Chen, J.-F. and Yu, S.-H. 2013. Ultralight, Flexible, and Fire-Resistant Carbon Nanofiber Aerogels from Bacterial Cellulose. Angew. Chem. Int. Ed. 52:2925-2929.

Xu, S. and Minteer, S. D. 2011. Enzymatic Biofuel Cell for Oxidation of Glucose to $CO_2$. ACS Catal. 1:91-94.

You, C., Myung, S. and Zhang, Y.-H. P. 2012. Facilitated substrate channeling in a self-assembled trifunctional enzyme complex. Angew. Chem. Int. Ed. 51:8787-8790.

You, C. et al. 2013. Enzymatic transformation of nonfood biomass to starch. Proc. Nat. Acad. Sci. USA 110:7182-7187.

Ye, X. et al. 2012. Synthetic metabolic engineering-a novel, simple technology for designing a chimeric metabolic pathway. Microb. Cell Fact. 11:120.

Zaks, A. and Klibanov, A. M. 1988. The effect of water on enzyme action in organic media. J. Biol. Chem. 263:8017-8021.

Zebda, A. et al. 2011. Mediatorless high-power glucose biofuel cells based on compressed carbon nanotube-enzyme electrodes. Nat. Commun. 2:370.

Zhang, Y.-H. P., Cui, J., Lynd, L. R. and Kuang, L. R. 2006. A transition from cellulose swelling to cellulose dissolution by o-phosphoric acid: evidence from enzymatic hydrolysis and supramolecular structure. Biomacromolecules 7, 644-648.

Zhang, Y.-H. P. 2009. A sweet out-of-the-box solution to the hydrogen economy: is the sugar-powered car science fiction? Energy Environ. Sci. 2:272-282.

Zhang, Y.-H. P. 2010. Production of biocommodities and bioelectricity by cell-free synthetic enzymatic pathway biotransformation: Challenges and opportunities. Biotechnol. Bioeng. 105:663-677.

Zhao, X., Jia, H., Kim, J. and Wang, P. 2009. Kinetic limitations of a bioelectrochemical electrode using carbon nanotube-attached glucose oxidase for biofuel cells. Biotechnol. Bioeng. 104:1068-1074.

Zhu Z, Wang Y, Minteer S, Zhang Y-H P. 2011. Maltodextrin-powered enzymatic fuel cell through a non-natural enzymatic pathway. J. Power Sources 196:7505-7509.

Zhu Z G, Sun F, Zhang X, Zhang Y-H P. 2012. Deep oxidation of glucose in enzymatic fuel cells through a synthetic enzymatic pathway containing a cascade of two thermostable dehydrogenases. Biosens. Bioelectron. 36:110-115.

What is claimed is:

1. A system for electricity generation, comprising:
a solution comprising a sugar, enzymes, and an electrolyte;

a fuel cell comprising an anode disposed in an anode compartment and a cathode disposed in a cathode compartment; and an electrical generator, wherein the solution and the electrical generator are in contact with the fuel cell;

wherein the electrolyte comprises a pH-control buffer containing metal ions, NAD+ or NADH or a biomimic thereof, and thiamine pyrophosphate; and wherein the enzymes comprise glucose 6-phosphate dehydrogenase, 6-phosphogluconate dehydrogenase, ribose 5-phosphate isomerase, ribulose 5-phosphate 3-epimerase, transketolase, transaldolase, triose phosphate isomerase, aldolase, fructose 1,6-bisphosphatase, phosphoglucose isomerase, and an enzyme capable of oxidizing NADH or a reduced biomimic thereof.

2. The system of claim 1, wherein the sugar is a hexose or a pentose sugar, or a mixture thereof.

3. The system of claim 1, wherein the enzyme capable of oxidizing NADH or a reduced biomimic thereof is diaphorase.

4. The system of claim 1, further comprising one or more of vitamin $K_3$, benzyl viologen, or a biomimetic thereof.

5. The system of claim 4, wherein one or more of vitamin $K_3$, benzyl viologen, or a biomimetic thereof is immobilized on the anode surface.

6. The system of claim 4, wherein one or more of vitamin $K_3$, benzyl viologen, or a biomimetic thereof is free in the anode compartment.

7. The system of claim 1, wherein the metal ions are $Mg^{2+}$, $Mn^{2+}$, or both.

8. The system of claim 1, wherein the pH-control buffer is HEPES buffer.

* * * * *